(12) United States Patent
Liang et al.

(10) Patent No.: US 9,463,988 B2
(45) Date of Patent: *Oct. 11, 2016

(54) ELECTRICAL PURIFICATION APPARATUS HAVING A BLOCKING SPACER

(71) Applicant: EVOQUA WATER TECHNOLOGIES PTE. LTD., Singapore (SG)

(72) Inventors: Li-Shiang Liang, Harvard, MA (US); Joseph D. Gifford, Marlborough, MA (US); Lawrence J. Salvo, Stow, MA (US); John K. Chan, Needham, MA (US)

(73) Assignee: Evoqua Water Technologies Pte. Ltd, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/598,641

(22) Filed: Jan. 16, 2015

(65) Prior Publication Data

US 2015/0122657 A1 May 7, 2015

Related U.S. Application Data

(63) Continuation of application No. 13/294,258, filed on Nov. 11, 2011, now Pat. No. 8,956,521.

(60) Provisional application No. 61/510,157, filed on Jul. 21, 2011, provisional application No. 61/413,021, filed on Nov. 12, 2010.

(51) Int. Cl.
*C02F 1/469* (2006.01)
*B01D 61/46* (2006.01)
(Continued)

(52) U.S. Cl.
CPC ............ *C02F 1/4695* (2013.01); *B01D 61/46* (2013.01); *B01D 61/48* (2013.01); *C02F 1/4693* (2013.01); *C25B 9/00* (2013.01); *C25B 9/08* (2013.01); *C25B 9/18* (2013.01); *H01F 41/02* (2013.01); *C02F 2201/46* (2013.01); *Y10T 29/49002* (2015.01); *Y10T 29/4902* (2015.01)

(58) Field of Classification Search
CPC ...... B01D 61/46; B01D 61/48; C02F 1/4693; C02F 1/4695
See application file for complete search history.

(56) References Cited

U.S. PATENT DOCUMENTS 2,784,158 A 3/1957 Bodamer et al.
2,894,894 A 7/1959 Kressman et al.
(Continued)

FOREIGN PATENT DOCUMENTS

AU 2008200413 A1 2/2009
CN 201037122 Y 3/2008
(Continued)

OTHER PUBLICATIONS

"Heed® Current Utilization Efficiency." EET Corporation. Sep. 3, 2009 capture of <http://www.eetcorp.com/Its/graph_HEED1.htm> using WayBack Machine Internet Archive.
(Continued)

*Primary Examiner* — Steven A. Friday

(57) ABSTRACT

An electrical purification apparatus and methods of making same are disclosed. The electrical purification apparatus may provide for increases in operation efficiencies, for example, with respect to current efficiencies and membrane utilization.

19 Claims, 43 Drawing Sheets

(51) Int. Cl.

| | |
|---|---|
| *B01D 61/48* | (2006.01) |
| *C25B 9/00* | (2006.01) |
| *C25B 9/08* | (2006.01) |
| *C25B 9/18* | (2006.01) |
| *H01F 41/02* | (2006.01) |

(56) References Cited

U.S. PATENT DOCUMENTS

| | | | |
|---|---|---|---|
| 2,923,674 | A | 2/1960 | Kressman |
| 2,990,361 | A | 6/1961 | Solt |
| 4,022,692 | A | 5/1977 | Janneck |
| 4,033,850 | A | 7/1977 | Kedem et al. |
| 4,217,200 | A | 8/1980 | Kedem et al. |
| 4,303,493 | A | 12/1981 | Kneifel et al. |
| 4,350,581 | A | 9/1982 | Schmoldt et al. |
| 4,569,747 | A | 2/1986 | Kedem et al. |
| 4,624,778 | A | 11/1986 | Clermont et al. |
| 4,732,656 | A | 3/1988 | Hurd |
| 5,116,509 | A | 5/1992 | White |
| 5,154,809 | A | 10/1992 | Oren et al. |
| 5,292,422 | A | 3/1994 | Liang et al. |
| 5,407,553 | A | 4/1995 | Herron et al. |
| 5,439,577 | A | 8/1995 | Weres et al. |
| 5,681,438 | A | 10/1997 | Proulx |
| 6,197,174 | B1 | 3/2001 | Barber et al. |
| 6,241,867 | B1 | 6/2001 | Mir |
| 6,284,124 | B1 | 9/2001 | DiMascio et al. |
| 6,379,518 | B1 * | 4/2002 | Osawa .................. B01D 61/48 204/524 |
| 6,402,920 | B1 | 6/2002 | Sato et al. |
| 6,649,037 | B2 | 11/2003 | Arba et al. |
| 6,929,748 | B2 | 8/2005 | Avijit et al. |
| 6,929,765 | B2 | 8/2005 | Cotton et al. |
| 7,094,325 | B2 | 8/2006 | Mack et al. |
| 7,147,785 | B2 | 12/2006 | Arba et al. |
| 7,232,507 | B2 | 6/2007 | Gattrell et al. |
| 7,335,284 | B2 | 2/2008 | Haenni et al. |
| 7,572,359 | B2 | 8/2009 | Liang et al. |
| 7,662,267 | B2 | 2/2010 | Carson et al. |
| 8,101,058 | B2 | 1/2012 | Liang et al. |
| 8,114,260 | B2 | 2/2012 | Wilkins et al. |
| 8,627,560 | B2 | 1/2014 | Liang et al. |
| 8,741,121 | B2 | 6/2014 | Liang et al. |
| 8,956,521 | B2 | 2/2015 | Liang et al. |
| 2001/0037942 | A1 | 11/2001 | Schmidt et al. |
| 2002/0011413 | A1 | 1/2002 | DiMascio et al. |
| 2003/0019818 | A1 | 1/2003 | Carson et al. |
| 2003/0079992 | A1 | 5/2003 | Wilkins et al. |
| 2003/0089609 | A1 | 5/2003 | Liang et al. |
| 2003/0173222 | A1 | 9/2003 | Srinivasan et al. |
| 2003/0235749 | A1 | 12/2003 | Haltiner et al. |
| 2004/0159543 | A1 | 8/2004 | Boyer et al. |
| 2004/0178075 | A1 | 9/2004 | Sato |
| 2004/0206627 | A1 | 10/2004 | Bejtlich et al. |
| 2005/0037254 | A1 | 2/2005 | Skala et al. |
| 2005/0051485 | A1 | 3/2005 | Saini |
| 2005/0064266 | A1 | 3/2005 | Abdou et al. |
| 2005/0087446 | A1 | 4/2005 | Liang et al. |
| 2005/0103630 | A1 | 5/2005 | Ganzi et al. |
| 2006/0016685 | A1 | 1/2006 | Hawkins et al. |
| 2006/0144787 | A1 | 7/2006 | Schmidt et al. |
| 2006/0163056 | A1 | 7/2006 | Grebenyuk et al. |
| 2006/0166053 | A1 | 7/2006 | Badding et al. |
| 2006/0231495 | A1 | 10/2006 | Freydina et al. |
| 2006/0249390 | A1 | 11/2006 | Yan et al. |
| 2006/0254919 | A1 | 11/2006 | Jangbarwala |
| 2006/0263646 | A1 | 11/2006 | Seale |
| 2007/0215474 | A1 * | 9/2007 | Batchelder .......... B01D 61/422 204/524 |
| 2008/0073215 | A1 | 3/2008 | Barber et al. |
| 2008/0105551 | A1 | 5/2008 | Wang et al. |
| 2008/0182147 | A1 | 7/2008 | Blake et al. |
| 2008/0245667 | A1 | 10/2008 | Jones et al. |
| 2010/0086819 | A1 | 4/2010 | Gemba et al. |
| 2010/0163471 | A1 | 7/2010 | Elyanow et al. |
| 2010/0181257 | A1 | 7/2010 | Frechet et al. |
| 2010/0282689 | A1 | 11/2010 | Ganzi et al. |
| 2010/0326833 | A1 | 12/2010 | Messalem et al. |
| 2012/0118738 | A1 | 5/2012 | Liang et al. |

FOREIGN PATENT DOCUMENTS

| | | |
|---|---|---|
| EP | 1387428 A2 | 2/2004 |
| EP | 1598318 A1 | 11/2005 |
| EP | 2131430 A1 | 12/2009 |
| GB | 852272 A | 10/1960 |
| JP | 2004-243194 A | 9/2004 |
| JP | 2009-095821 A | 5/2009 |
| WO | 9406548 A1 | 3/1994 |
| WO | 03026049 A2 | 3/2003 |
| WO | 2005092799 A1 | 10/2005 |
| WO | 2008036461 A1 | 3/2008 |
| WO | 2008048656 A2 | 4/2008 |
| WO | 2009051612 A1 | 4/2009 |
| WO | 2009077992 A2 | 6/2009 |
| WO | 2011163278 A2 | 12/2011 |

OTHER PUBLICATIONS

"Laboratory Electrodialysis Cell Series," PCA Electrodialysis Cells, http://www.pca-gmbh.conn/pccell/labcell.htm printed May 14, 2013.

Holt, "The path of least resistance," Electrical Construction and Maintenance, Jul. 1, 2001, <http://ecmweb.com/content/path-least-resistance>.

International Search Report for PCT/US2011/60312 dated Mar. 20, 2012.

Sadrzadeh et al., "Treatment of sea water using electrodialysis: Current efficiency evaluation," Oct. 2, 2009, Desalination, vol. 249, Issue 1, pp. 279-285.

Tanaka et al. "A Computer Simulation of Ion Exchange Membrane Electrodialysis for Concentration of Seawater". Membrane Water Treatment, vol. 1, No. 1 (2010) pp. 13-37.

Von Gottberg, Antonia, "New High-Performance Spacers in Electrodialysis Reversal (EDR) Systems," GE Power & Water, Water & Process Technologies Technical Paper, General Electric Company (2010; originally published in Proceedings of 1998 AWWA Annual Conference, Jun. 21-25, 1998, Dallas, Texas), pp. 1-8.

U.S. Appl. No. 13/294,231, filed Nov. 11, 2011, Li-Shiang Liang et al.

U.S. Appl. No. 13/294,228, filed Nov. 11, 2011, Li-Shiang Liang et al.

U.S. Appl. No. 14/149,594, filed Jan. 7, 2014, Li-Shiang Liang et al.

U.S. Appl. No. 13/294,254, filed Nov. 11, 2011, Li-Shiang Liang et al.

U.S. Appl. No. 13/294,266, filed Nov. 11, 2011, Li-Shiang Liang et al.

U.S. Appl. No. 13/294,235, filed Nov. 11, 2011, Li-Shiang Liang et al.

U.S. Appl. No. 13/294,238, filed Nov. 11, 2011, Li-Shiang Liang et al.

* cited by examiner

ELECTRICAL PURIFICATION APPARATUS HAVING A BLOCKING SPACER

CROSS-REFERENCE TO RELATED APPLICATIONS

This application is a continuation of U.S. patent application Ser. No. 13/294,258, filed on Nov. 11, 2011, titled "ELECTRICAL PURIFICATION APPARATUS HAVING A BLOCKING SPACER" which claims priority under 35 U.S.C. §119(e) of U.S. Provisional Patent Application Ser. No. 61/413,021, filed on Nov. 12, 2010, titled "CROSS-FLOW ELECTROCHEMICAL DEIONIZATION DEVICE AND METHODS OF MANUFACTURING THEREOF" and U.S. Provisional Patent Application Ser. No. 61/510,157, filed on Jul. 21, 2011, titled "MODULAR CROSS-FLOW ELECTRODIALYSIS DEVICES AND METHODS OF MANUFACTURING THEREOF," the entire disclosure of each of which is hereby incorporated herein by reference in its entirety for all purposes.

FIELD OF THE DISCLOSURE

This disclosure relates to systems and methods of water treatment, and methods of making a system or apparatus for treating water. More particularly, this disclosure relates to systems and methods of water treatment using an electrical purification apparatus, and methods of making an electrical purification apparatus for treating water.

SUMMARY

One or more aspects of the disclosure relate to a method of preparing a first cell stack for an electrical purification apparatus. The method may comprise securing a first anion exchange membrane to a first cation exchange membrane at a first portion of a periphery of the first anion exchange membrane and the first cation exchange membrane to form a first compartment having a first fluid flow path. The method may also comprise securing a second anion exchange membrane to the first cation exchange membrane at a second portion of the periphery of the first cation exchange membrane and a first portion of a periphery of the second anion exchange membrane to form a second compartment having a second fluid flow path in a direction different from the first fluid flow path. Each of the first compartment and the second compartment may be constructed and arranged to provide a fluid contact of greater than 85% of the surface area of each of the first cation exchange membrane, the first anion exchange membrane and the second cation exchange membrane.

Other aspects of the disclosure relate to a method for preparing a cell stack for an electrical purification apparatus. The method may comprise forming a first compartment by securing a first cation exchange membrane to a first anion exchange membrane at a first portion of a periphery of the first cation exchange membrane and the first anion exchange membrane to provide a first spacer assembly having a first spacer disposed between the first cation exchange membrane and the first anion exchange membrane. The method may also comprise forming a second compartment by securing a second anion exchange membrane to a second cation exchange membrane at a first portion of a periphery of the second cation exchange membrane and the second anion exchange membrane to provide a second spacer assembly having a second spacer disposed between the second anion exchange membrane and the second cation exchange membrane. The method may also comprise forming a third compartment by securing the first spacer assembly to the second spacer assembly at a second portion of the periphery of the first cation exchange membrane and at a portion of the periphery of the second anion exchange membrane to provide a stack assembly having a spacer disposed between the first spacer assembly and the second spacer assembly. Each of the first compartment and the second compartment may be constructed and arranged to provide a direction of fluid flow in a direction different from the direction of fluid flow in the third compartment.

Still other aspects of the disclosure may provide an electrical purification apparatus comprising a cell stack. The cell stack may comprise a first compartment comprising a first cation exchange membrane and a first anion exchange membrane. The first compartment may be constructed and arranged to provide a direct fluid flow in a first direction between the first cation exchange membrane and the first anion exchange membrane. The cell stack may also comprise a second compartment comprising the first anion exchange membrane and a second cation exchange membrane to provide a direct fluid flow in a second direction between the first anion exchange membrane and the second cation exchange membrane. Each of the first compartment and the second compartment constructed and arranged to provide a fluid contact of greater than 85% of the surface area of the first cation exchange membrane, the first anion exchange membrane, and the second cation exchange membrane.

Still other aspects of the disclosure relate to a cell stack for an electrical purification apparatus. The cell stack may comprise a plurality of alternating ion depleting and ion concentrating compartments. Each of the ion depleting compartments may have an inlet and an outlet that provides a dilute fluid flow in a first direction. Each of the ion concentrating compartments may have an inlet and an outlet that provides a concentrated fluid flow in a second direction that is different from the first direction. The cell stack may also comprise a blocking spacer positioned in the cell stack. The blocking spacer may be constructed and arranged to alter the direction of at least one of a dilute fluid flow and a concentrated fluid flow through the cell stack.

Still other aspects of the disclosure relate to an electrical purification apparatus. The electrical purification apparatus comprises a cell stack comprising alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction. The electrical purification apparatus may comprise a first electrode adjacent an anion exchange membrane at a first end of the cell stack. The electrical purification apparatus may also comprise a second electrode adjacent a cathode exchange membrane at a second end of the cell stack. A blocking spacer may be positioned in the cell stack and constructed and arranged to redirect at least one of a dilute fluid flow and a concentrate fluid flow through the electrical purification apparatus and to prevent a direct current path between the first electrode and the second electrode.

In still further aspects of the disclosure, a method of providing a source of potable water is provided. The method may comprise providing an electrical purification apparatus comprising a cell stack. The cell stack may comprise alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction. Each of the ion concentrating compartments and ion diluting compartments may be constructed and arranged to provide a fluid contact of greater than 85% of the surface area of each of the alternating ion diluting compartments and ion depleting compartments. The method may further comprise fluidly connecting a seawater feed stream comprising about 35,000 ppm total dissolved solids to an inlet of the electrical purification apparatus. The method may further comprise fluidly connecting an outlet of the electrical purification apparatus to a potable point of use.

BRIEF DESCRIPTION OF THE DRAWINGS

The accompanying drawings are not intended to be drawn to scale. In the drawings, each identical or nearly identical component that is illustrated in various FIGS. is represented by a like numeral. For purposes of clarity, not every component may be labeled in every drawing.

In the drawings:

FIG. 38B is a cross-section of FIG. 38A along line B-B.

DETAILED DESCRIPTION

Figure 1:
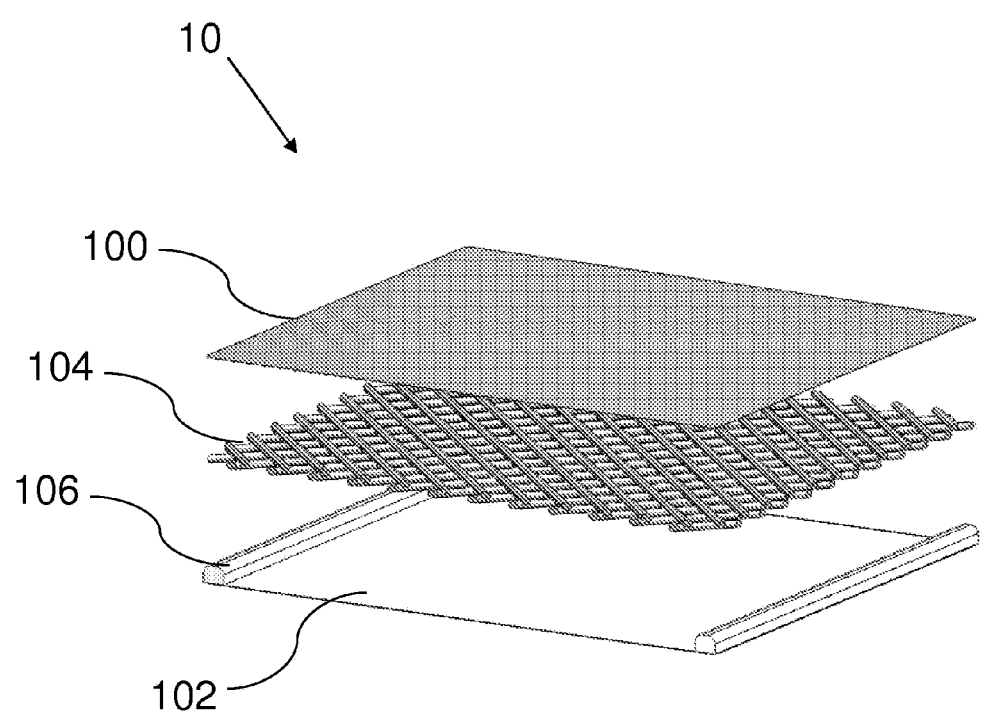
FIG. 1 is a schematic illustration of a portion of an electrical purification apparatus in accordance with one or more embodiments of the disclosure.

Devices for purifying fluids using electrical fields are commonly used to treat water and other liquids containing dissolved ionic species. Two types of devices that treat water in this way are electrodeionization and electrodialysis devices.

Electrodeionization (EDI) is a process that removes, or at least reduces, one or more ionized or ionizable species from water using electrically active media and an electric potential to influence ion transport. The electrically active media typically serves to alternately collect and discharge ionic and/or ionizable species and, in some cases, to facilitate the transport of ions, which may be continuously, by ionic or electronic substitution mechanisms. EDI devices can comprise electrochemically active media of permanent or temporary charge, and may be operated batch-wise, intermittently, continuously, and/or even in reversing polarity modes. EDI devices may be operated to promote one or more electrochemical reactions specifically designed to achieve or enhance performance. Further, such electrochemical devices may comprise electrically active membranes, such as semi-permeable or selectively permeable ion exchange or bipolar membranes. Continuous electrodeionization (CEDI) devices are EDI devices known to those skilled in the art that operate in a manner in which water purification can proceed continuously, while ion exchange material is continuously recharged. CEDI techniques can include processes such as continuous deionization, filled cell electrodialysis, or electrodiaresis. Under controlled voltage and salinity conditions, in CEDI systems, water molecules can be split to generate hydrogen or hydronium ions or species and hydroxide or hydroxyl ions or species that can regenerate ion exchange media in the device and thus facilitate the release of the trapped species therefrom. In this manner, a water stream to be treated can be continuously purified without requiring chemical recharging of ion exchange resin.

Electrodialysis (ED) devices operate on a similar principle as CEDI, except that ED devices typically do not contain electroactive media between the membranes. Because of the lack of electroactive media, the operation of ED may be hindered on feed waters of low salinity because of elevated electrical resistance. Also, because the operation of ED on high salinity feed waters can result in elevated electrical current consumption, ED apparatus have heretofore been most effectively used on source waters of intermediate salinity. In ED based systems, because there is no electroactive media, splitting water is inefficient and operating in such a regime is generally avoided.

In CEDI and ED devices, a plurality of adjacent cells or compartments are typically separated by selectively permeable membranes that allow the passage of either positively or negatively charged species, but typically not both. Dilution or depletion compartments are typically interspaced with concentrating or concentration compartments in such devices. As water flows through the depletion compartments, ionic and other charged species are typically drawn into concentrating compartments under the influence of an electric field, such as a DC field. Positively charged species are drawn toward a cathode, typically located at one end of a stack of multiple depletion and concentration compartments, and negatively charged species are likewise drawn toward an anode of such devices, typically located at the opposite end of the stack of compartments. The electrodes are typically housed in electrolyte compartments that are usually partially isolated from fluid communication with the depletion and/or concentration compartments. Once in a concentration compartment, charged species are typically trapped by a barrier of selectively permeable membrane at least partially defining the concentration compartment. For example, anions are typically prevented from migrating further toward the cathode, out of the concentration compartment, by a cation selective membrane. Once captured in the concentrating compartment, trapped charged species can be removed in a concentrate stream.

In CEDI and ED devices, the DC field is typically applied to the cells from a source of voltage and electric current applied to the electrodes (anode or positive electrode, and cathode or negative electrode). The voltage and current source (collectively "power supply") can be itself powered by a variety of means such as an AC power source, or for example, a power source derived from solar, wind, or wave power. At the electrode/liquid interfaces, electrochemical half cell reactions occur that initiate and/or facilitate the transfer of ions through the membranes and compartments. The specific electrochemical reactions that occur at the electrode/interfaces can be controlled to some extent by the concentration of salts in the specialized compartments that house the electrode assemblies. For example, a feed to the anode electrolyte compartments that is high in sodium chloride will tend to generate chlorine gas and hydrogen ion, while such a feed to the cathode electrolyte compartment will tend to generate hydrogen gas and hydroxide ion. Generally, the hydrogen ion generated at the anode compartment will associate with a free anion, such as chloride ion, to preserve charge neutrality and create hydrochloric acid solution, and analogously, the hydroxide ion generated at the cathode compartment will associate with a free cation, such as sodium, to preserve charge neutrality and create sodium hydroxide solution. The reaction products of the electrode compartments, such as generated chlorine gas and sodium hydroxide, can be utilized in the process as needed for disinfection purposes, for membrane cleaning and defouling purposes, and for pH adjustment purposes.

Plate-and-frame and spiral wound designs have been used for various types of electrochemical deionization devices including but not limited to electrodialysis (ED) and electrodeionization (EDI) devices. Commercially available ED devices are typically of plate-and-frame design, while EDI devices are available in both plate and frame and spiral configurations.

The present invention relates to devices that may purify fluids electrically that may be contained within a housing, as well as methods of manufacture and use thereof. Liquids or other fluids to be purified enter the purification device or apparatus and, under the influence of an electric field, are treated to produce an ion-depleted liquid. Species from the entering liquids are collected to produce an ion-concentrated liquid. The components of the electrical purification apparatus, which may also be referred to as an electrochemical separation system or an electrochemical separation device, may be assembled using various techniques to achieve optimal operation of the apparatus.

In some embodiments of the present disclosure, a method is provided for securing or bonding ion exchange membranes and, optionally, spacers to produce a membrane cell stack for an electrical purification apparatus. The method may provide for securing of multiple anion exchange membranes and cation exchange membranes for use in electrical purification apparatus such as a cross-flow electrodialysis (ED) device.

In certain embodiments of the disclosure, a method of preparing a first cell stack for an electrical purification apparatus is provided. The method may comprise securing a first ion exchange membrane to a second ion exchange membrane. A spacer may be positioned between the first ion exchange membrane and the second ion exchange membrane to form a spacer assembly. When used in an electrical purification apparatus, this spacer assembly defines a first compartment that may allow fluid flow. A plurality of ion exchange membranes may be secured to one another to provide a series of compartments. In certain embodiments, a plurality of spacer assemblies may be constructed and the spacer assemblies may be secured to one another. A spacer may be positioned between each of the spacer assemblies. In this way, a series of compartments for an electrical purification apparatus is constructed to allow fluid flow in one or more directions in each of the compartments.

The spacers that may be positioned within the compartments may provide structure to and define the compartments and, in certain examples, may assist in directing fluid flow through the compartment. The spacers may be made of polymeric materials or other materials that allow for a desired structure and fluid flow within the compartments. In certain embodiments, the spacers may be constructed and arranged to redirect or redistribute fluid flow within the compartments. In some examples, the spacer may comprise a mesh-like or screen material to provide structure and allow for the desired fluid flow through the compartment.

In accordance with one or more embodiments, the efficiency of electrochemical separation systems may be improved. Current loss is one potential source of inefficiency. In some embodiments, such as those involving a cross-flow design, the potential for current leakage may be addressed. Current efficiency may be defined as the percentage of current that is effective in moving ions out of the dilute stream into the concentrate stream. Various sources of current inefficiency may exist in an electrochemical separation system or electrical purification apparatus. One potential source of inefficiency may involve current that bypasses the cell pairs (pairs of adjacent concentration and diluting compartments) by flowing through the dilute and concentrate inlet and outlet manifolds. Open inlet and outlet manifolds may be in direct fluid communication with flow compartments and may reduce pressure drop in each flow path. Part of the electrical current from one electrode to the other may bypass the stack of cell pairs by flowing through the open areas. The bypass current reduces current efficiency and increases energy consumption. Another potential source of inefficiency may involve ions that enter the dilute stream from the concentrate due to imperfect permselectivity of ion exchange membranes. In some embodiments, techniques associated with the sealing and potting of membranes and screens within a device may facilitate reduction of current leakage.

In one or more embodiments, a bypass path through a stack may be manipulated to promote current flow along a direct path through a cell stack so as to improve current efficiency. In some embodiments, an electrochemical separation device or electrical purification apparatus may be constructed and arranged such that one or more bypass paths are more tortuous than a direct path through the cell stack. In at least certain embodiments, an electrochemical separation device or electrical purification apparatus may be constructed and arranged such that one or more bypass paths present higher resistance than a direct path through the cell stack. In some embodiments involving a modular system, individual modular units may be configured to promote current efficiency. Modular units may be constructed and arranged to provide a current bypass path that will contribute to current efficiency. In non-limiting embodiments, a modular unit may include a manifold system and/or a flow distribution system configured to promote current efficiency. In at least some embodiments, a frame surrounding a cell stack in an electrochemical separation unit may be constructed and arranged to provide a predetermined current bypass path. In some embodiments, promoting a multi-pass flow configuration within an electrochemical separation device may facilitate reduction of current leakage. In at least some non-limiting embodiments, blocking membranes or spacers may be inserted between modular units to direct dilute and/or concentrate streams into multiple-pass flow configurations for improved current efficiency. In some embodiments, current efficiency of at least about 60% may be achieved. In other embodiments, a current efficiency of at least about 70% may be achieved. In still other embodiments, a current efficiency of at least about 80% may be achieved. In at least some embodiments, a current efficiency of at least about 85% may be achieved.

The spacer may be constructed and arranged to redirect at least one of fluid flow and electrical current to improve current efficiency. The spacer may also be constructed and arranged to create multiple fluid flow stages in an electrical purification apparatus. The spacer may comprise a solid portion to redirect fluid flow in a particular direction. The solid portion may also redirect electrical current flow in a particular direction, and prevent a direct path between an anode and a cathode in an electrical purification apparatus. A spacer comprising a solid portion may be referred to as a blocking spacer. The blocking spacer may be positioned within a cell stack, or may be positioned between a first cell stack, or first modular unit, and a second cell stack, or second modular unit.

In some embodiments, the plurality of ion exchange membranes secured to one another may alternate between cation exchange membranes and anion exchange membranes to provide a series of ion diluting compartments and ion concentrating compartments.

The geometry of the membranes may be of any suitable geometry such that the membranes may be secured within a cell stack. In certain embodiments, a particular number of corners or vertices on the cell stack may be desired so as to suitably secure the cell stack within a housing. In certain embodiments, particular membranes may have different geometries than other membranes in the cell stack. The geometries of the membranes may be selected to assist in at least one of securing the membranes to one another, to secure spacers within the cell stack, to secure membranes within a modular unit, to secure membranes within a support structure, to secure a group of membranes such as a cell stack to a housing, and to secure a modular unit into a housing.

The membranes, spacers, and spacer assemblies may be secured at a portion of a periphery or edge of the membranes, spacers, or spacer assemblies. A portion of a periphery may be a continuous or non-continuous length of the membrane, spacer, or spacer assembly. The portion of the periphery that is selected to secure the membrane, spacer, or spacer assembly may provide a boundary or border to direct fluid flow in a predetermined direction.

In certain embodiments, a method of preparing a cell stack may comprise securing a first anion exchange membrane to a first cation exchange membrane at a first portion of a periphery of the first anion exchange membrane and the first cation exchange membrane to form a first compartment having a first fluid flow path. The method may further comprise securing a second anion exchange membrane to the first cation exchange membrane at a second portion of the periphery of the first cation exchange membrane and a first portion of a periphery of the second anion exchange membrane to form a second compartment having a second fluid flow path in a direction different from the first fluid flow path.

The first fluid flow path and the second fluid flow path may be selected and provided by way of the portions of the peripheries of the ion exchange membranes that are secured to one another. Using the first fluid flow path as a direction running along a 0° axis, the second fluid flow path may run in a direction of any angle greater than zero degrees and less than 360°. In certain embodiments of the disclosure, the second fluid flow path may run at a 90° angle, or perpendicular to the first fluid flow path. In other embodiments, the second fluid flow path may run at a 180° angle to the first fluid flow path. In another embodiment, the first fluid flow path may be running in a direction of 0°. The second fluid flow path may be running at 60°, and a third fluid flow path may be running at 120°. A fourth fluid flow path may be running at 0°.

If additional ion exchange membranes are secured to the cell stack to provide additional compartments, the fluid flow paths in these additional compartments may be the same or different from the first fluid flow path and the second fluid flow path. In certain embodiments, the fluid flow path in each of the compartments alternates between a first fluid flow path and a second fluid flow path. For example, the first fluid flow path in the first compartment may be running in a direction of 0°. The second fluid flow path in the second compartment may be running in a direction of 90°, and the third fluid flow path in the third compartment may be running in a direction of 0°. In certain examples, a first fluid flow path running in a first direction, and a second fluid flow path running in a second direction may be referred to as cross-flow electrical purification.

In other embodiments, the fluid flow path in each of the compartments alternates sequentially between a first fluid flow path, a second fluid flow path, and a third fluid flow path. For example, the first fluid flow path in the first compartment may be running in a direction of 0°. The second fluid flow path in the second compartment may be running at 30°, and the third fluid flow path in the third compartment may be running at 90°. The fourth fluid flow path in the fourth compartment may be running at 0°. In another embodiment, the first fluid flow path in the first compartment may be running in a direction of 0°. The second fluid flow path in the second compartment may be running at 60°, and the third fluid flow path in the third compartment may be running at 120°. The fourth fluid flow path in the fourth compartment may be running at 0°.

In certain embodiments of the disclosure, the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment, which will be discussed further below. In certain embodiments, the obstructions, projections, protrusions flanges, or baffles may be referred to as a flow redistributor.

Each of the compartments in the cell stack for an electrical purification apparatus may be constructed and arranged to provide a predetermined percentage of surface area or membrane utilization for fluid contact. It has been found that greater membrane utilization provides greater efficiencies in the operation of the electrical purification apparatus. Advantages of achieving greater membrane utilization may include lower energy consumption, smaller footprint of the apparatus, less passes through the apparatus, and higher quality product water. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of the spacer. In order to obtain a predetermined membrane utilization, appropriate securing techniques and components may be selected in order to achieve a reliable and secure seal that allows optimal operation of the electrical purification apparatus, without encountering leakage within the apparatus, while maintaining a large surface area of membrane that may be used in the process.

Sealing may be accomplished by any suitable means for ensuring mating between the membranes so as to provide the desired fluid flow path through compartments defined by the membranes. For example, sealing may be accomplished by adhesives, thermal bonding by laser or ultrasonic welding, for example, or by mating or interlocking, for example, using male and female features on adjacent membranes and/or spacers. In certain examples, to construct a membrane cell stack, multiple spacer assemblies are constructed and are bonded or secured together with adhesives applied at portions of the periphery of the spacer assemblies. Spacers are positioned between each of the spacer assemblies secured together. In certain examples, the spacer assemblies may be secured to one another at a portion of the periphery of each of the spacer assemblies to provide a plurality of compartments having at least two fluid flow paths. For example, the spacer assemblies may be secured to one another to provide a first compartment having a fluid flow path in a first direction and a second compartment having a fluid flow path in a second direction. In place of adhesives, thermal bonding or mechanical interlocking features may be used to provide the compartments.

In some embodiments of the disclosure a method for preparing a cell stack for an electrical purification apparatus comprises forming compartments. A first compartment may be formed by securing ion exchange membranes to one another to provide a first spacer assembly having a first spacer disposed between the ion exchange membranes. For example, a first cation exchange membrane may be secured to a first anion exchange membrane at a first portion of a periphery of the first cation exchange membrane and the first anion exchange membrane to provide a first spacer assembly having a first spacer disposed between the first cation exchange membrane and the first anion exchange membrane.

A second compartment may be formed by securing ion exchange membranes to one another to provide a second spacer assembly having a second spacer disposed between the ion exchange membranes. For example, a second anion exchange membrane may be secured to a second cation exchange membrane at a first portion of a periphery of the second cation exchange membrane and the second anion exchange membrane to provide a second spacer assembly having a second spacer disposed between the second anion exchange membrane and the second cation exchange membrane.

A third compartment may be formed between the first compartment and the second compartment by securing the first spacer assembly to the second spacer assembly, and by positioning a spacer therebetween. For example, the first spacer assembly may be secured to the second spacer assembly at a second portion of the periphery of the first cation exchange membrane and at a portion of the periphery of the second anion exchange membrane to provide a stack assembly having a spacer disposed between the first spacer assembly and the second spacer assembly.

Each of the first compartment and the second compartment may be constructed and arranged to provide a direction of fluid flow that is different from the direction of fluid flow in the third compartment. For example, the fluid flow in the third compartment may be running in a direction of a 0° axis. The fluid flow in the first compartment may be running at 30°, and the fluid flow in the second compartment may be running at the same angle as the first compartment (30°) or at another angle, such as 120°. In another example, the fluid flow path in the first compartment may be running in a direction of 0°. The fluid flow path in the third compartment may be running at 60°, and the fluid flow path in the second compartment may be running at 120°. A fluid flow path in a fourth compartment may be running at 0°.

The method may further comprise securing the assembled cell stack within a housing.

In accordance with one or more embodiments, an electrochemical separation system or electrical purification apparatus may be modular. Each modular unit may generally function as a sub-block of an overall electrochemical separation system. A modular unit may include any desired number of cell pairs. In some embodiments, the number of cell pairs per modular unit may depend on the total number of cell pairs and passes in the separation device. It may also depend on the number of cell pairs that can be thermally bonded and potted in a frame with an acceptable failure rate when tested for cross-leaks and other performance criteria. The number can be based on statistical analysis of the manufacturing process and can be increased as process controls improve. In some non-limiting embodiments, a modular unit may include about 50 cell pairs. Modular units may be individually assembled and quality control tested, such as for leakage, separation performance and pressure drop prior to being incorporated into a larger system. In some embodiments, a cell stack may be mounted in a frame as a modular unit that can be tested independently. A plurality of modular units can then be assembled together to provide an overall intended number of cell pairs in an electrochemical separation device. In some embodiments, an assembly method may generally involve placing a first modular unit on a second modular unit, placing a third modular unit on the first and second modular units, and repeating to obtain a plurality of modular units of a desired number. In some embodiments, the assembly or individual modular units may be inserted into a pressure vessel for operation. Multi-pass flow configurations may be possible with the placement of blocking membranes and/or spacers between modular units or within modular units. A modular approach may improve manufacturability in terms of time and cost savings. Modularity may also facilitate system maintenance by allowing for the diagnosis, isolation, removal and replacement of individual modular units. Individual modular units may include manifolding and flow distribution systems to facilitate an electrochemical separation process. Individual modular units may be in fluid communication with one another, as well as with central manifolding and other systems associated with an overall electrochemical separation process.

The cell stack may be secured within a frame or support structure comprising an inlet manifold and an outlet manifold to provide a modular unit. This modular unit may then be secured within a housing. The modular unit may further comprise a bracket assembly or corner support that may secure the modular unit to the housing. A second modular unit may be secured within the housing. One or more additional modular units may also be secured within the housing. In certain embodiments of the disclosure, a blocking spacer may be positioned between the first modular unit and the second modular unit.

A flow redistributor may be present in one or more of the compartments of the cell stack. In assembling the cell stack, a first portion of the periphery of an ion exchange membrane in the cell stack may be constructed and arranged to interlock with a first portion of a periphery of an adjacent ion exchange membrane. In certain examples, a first portion of a periphery of a first spacer in the cell stack may be constructed and arranged to interlock with a first portion of a periphery of an adjacent spacer.

In some embodiments of the disclosure, an electrical purification apparatus comprising a cell stack is provided. The electrical purification apparatus may comprise a first compartment comprising ion exchange membranes and may be constructed and arranged to provide a direct fluid flow in a first direction between the ion exchange membranes. The electrical purification apparatus may also comprise a second compartment comprising ion exchange membranes and may be constructed and arranged to provide a direct fluid flow in a second direction. Each of the first compartment and the second compartment may be constructed and arranged to provide a predetermined percentage of surface area or membrane utilization for fluid contact. In certain embodiments, the membrane utilization that may be achieved is greater than 65%. In other embodiments, the membrane utilization that may be achieved is greater than 75%. In certain other embodiments, the membrane utilization that may be achieved may be greater than 85%. The membrane utilization may be at least in part dependent on the methods used to secure each of the membranes to one another, and the design of the spacer. In order to obtain a predetermined membrane utilization, appropriate securing techniques and components may be selected in order to achieve a reliable and secure seal that allows optimal operation of the electrical purification apparatus, without encountering leakage within the apparatus, while maintaining a large surface area of membrane that may be used in the process.

For example an electrical purification apparatus comprising a cell stack may be provided. The electrical purification apparatus may comprise a first compartment comprising a first cation exchange membrane and a first anion exchange membrane, the first compartment constructed and arranged to provide a direct fluid flow in a first direction between the first cation exchange membrane and the first anion exchange membrane. The apparatus may also comprise a second compartment comprising the first anion exchange membrane and a second cation exchange membrane to provide a direct fluid flow in a second direction between the first anion exchange membrane and the second cation exchange membrane. Each of the first compartment and the second compartment may be constructed and arranged to provide a predetermined membrane utilization, for example, a fluid contact of greater than 85% of the surface area of the first cation exchange membrane, the first anion exchange membrane and the second cation exchange membrane. At least one of the first compartment and the second compartment may comprise a spacer, which may be a blocking spacer.

The direct fluid flow in the first direction and the second direction may be selected and provided by the construction and arrangement of the compartments. Using the first direction of fluid flow as a direction running along a 0° axis, the second direction of fluid flow may run at any angle greater than zero degrees and less than 360°. In certain embodiments of the disclosure, the second direction of fluid flow may be at an angle of 90° angle, or perpendicular, to the first direction of fluid flow. In other embodiments, the second direction of fluid flow may be at an 80° angle to the first direction of fluid flow. If additional ion exchange membranes are secured to the cell stack to provide additional compartments, the direction of fluid flow in these additional compartments may be the same or different from the first direction of fluid flow and the second direction of fluid flow. In certain embodiments, the direction of fluid flow in each of the compartments alternates between a first direction of fluid flow and a second direction of fluid flow. For example, the first direction of fluid flow may run in a direction of 0°. The second direction of fluid flow may run at a 90° angle, and a third direction of fluid flow in a third compartment may run at a direction of 0°.

The electrical purification apparatus comprising a cell stack may further comprise a housing enclosing the cell stack, with at least a portion of a periphery of the cell stack secured to the housing. A frame may be positioned between the housing and the cell stack to provide first modular unit in the housing. A flow redistributor may be present in one or more of the compartments of the cell stack. At least one of the compartments may be constructed and arranged to provide flow reversal within the compartment.

In some embodiments of the disclosure, a cell stack for an electrical purification apparatus is provided. The cell stack may provide a plurality of alternating ion depleting and ion concentrating compartments. Each of the ion depleting compartments may have an inlet and an outlet that provides a dilute fluid flow in a first direction. Each of the ion concentrating compartments may have an inlet and an outlet that provides a concentrated fluid flow in a second direction that is different from the first direction. A spacer may be positioned in the cell stack. The spacer may provide structure to and define the compartments and, in certain examples, may assist in directing fluid flow through the compartment. The spacer may be a blocking spacer which may be constructed and arrange to redirect at least one of fluid flow and electrical current through the cell stack. As discussed, the blocking spacer may reduce or prevent electrical current inefficiencies in the electrical purification apparatus.

In some embodiments of the disclosure, an electrical purification apparatus is provided. The apparatus may comprise a cell stack comprising alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction. The electrical purification apparatus may also comprise a first electrode adjacent an first ion exchange membrane at a first end of the cell stack, and a second electrode adjacent a second ion exchange membrane at a second end of the cell stack. Each of the first ion exchange membrane and the second ion exchange membrane may be an anion exchange membrane or a cation exchange membrane. For example, the first ion exchange membrane may be an anion exchange membrane, and the second ion exchange membrane may be a cation exchange membrane. The apparatus may further comprise a blocking spacer positioned in the cell stack and constructed and arranged to redirect at least one of a dilute fluid flow and a concentrate fluid flow through the electrical purification apparatus and to prevent a direct current path between the first electrode and the second electrode. As discussed above, the blocking spacer may be constructed and arranged to reduce electrical current inefficiencies in the electrical purification apparatus.

The cell stack for the electrical purification apparatus may be enclosed in a housing with at least a portion of a periphery of the cell stack secured to the housing. A frame may be positioned between the housing and the cell stack to provide first modular unit in the housing. A second modular unit may also be secured within the housing. A blocking spacer may also be positioned between the first modular unit and the second modular unit. A flow redistributor may be present in one or more of the compartments of the cell stack. At least one of the compartments may be constructed and arranged to provide flow reversal within the compartment. A bracket assembly may be positioned between the frame and the housing to provide support to the modular unit and to secure the modular unit within the housing.

In certain embodiments of the disclosure, a portion of the periphery of the ion exchange membranes or the spacers in the cell stack may be treated or coated with a material so as to provide an enhanced, secure bond with the securing material, such as an adhesive, and the components of the cell stack. A seal band may be provided on the spacers, membranes, or both to provide a continuous surface upon which adhesive may be applied to join ion exchange membranes, such as anion and cation exchange membranes. The seal band may also provide support to the periphery of the membrane. The seal band may prevent or mitigate adhesive wet-through or wicking of the adhesive, thereby allowing less adhesive used for securing the spacers and membranes together. The seal bands may also contribute to greater membrane utilization based on less adhesive being used. In certain examples, the seal band may be applied to the spacer by injection molding, compression molding, coating, or the like.

FIG. 1 shows a spacer assembly 10 that comprises cation exchange membrane 100, spacer 104, and anion exchange membrane 102. The spacer 104, which may be a screen spacer, may allow for adhesive 106 to be applied. The membranes may be sealed along two opposite edges by adhesives or by thermal bonding techniques, for example, laser, vibration, or ultrasonic welding. A wide range of adhesives can be used for the membrane side seam, including epoxies with aliphatic, cycloaliphatic and aromatic amine curing agents and urethanes, as will be described in more detail below. When adhesive is being applied to glue line of the membrane cell, it may be beneficial if the adhesive remains primarily on the predetermined glue line. If viscosity is too low, the adhesive may run or drip off from the glue line. If the adhesive viscosity is too high, spreading the adhesive may become difficult.

If the spacer is a screen, it may be encapsulated within the adhesive which also bonds the two adjacent membranes.

Figure 2:
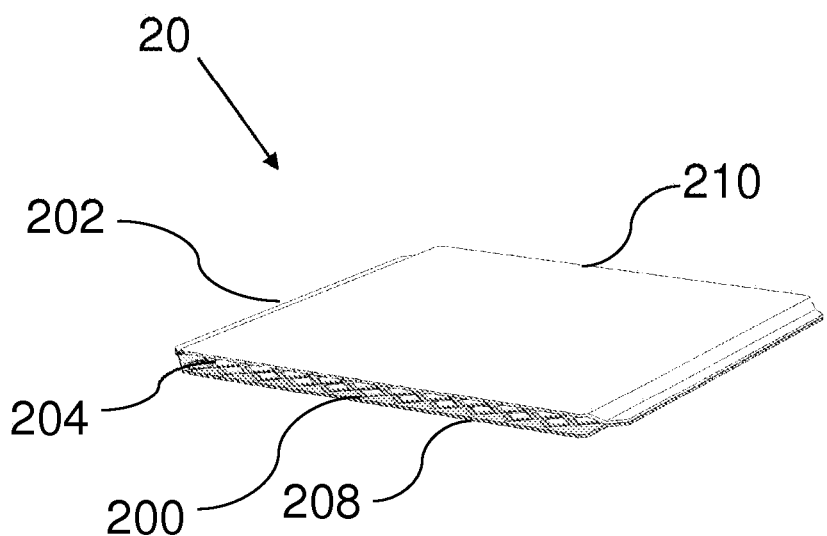
FIG. 2 is a schematic illustration of a portion of an electrical purification apparatus in accordance with one or more embodiments of the disclosure.

FIG. 2 shows spacer assembly 20 comprising cation exchange membrane 200, spacer 204, and anion exchange membrane 202. Spacer 204 separates cation exchange membrane 200 and anion exchange membrane 202, and may define the flow compartment and enhance mixing and mass transfer as the liquid stream flows from inlet side 208 to outlet side 210.

Figure 3:
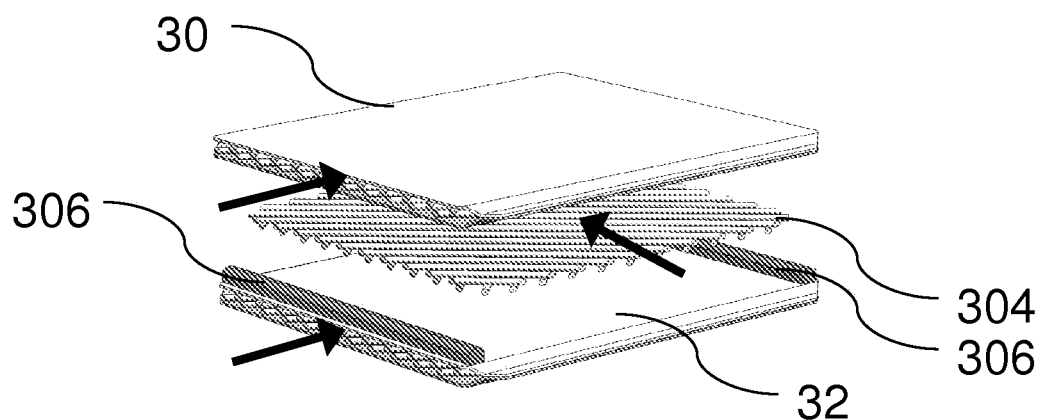
FIG. 3 is a schematic illustration of a portion of an electrical purification apparatus in accordance with one or more embodiments of the disclosure.

FIG. 3 shows first spacer assembly 30 and second spacer assembly 32, separated by spacer 304. The two assemblies are bonded together by adhesives 306 applied along two parallel edges that are perpendicular to the edges already sealed in the assemblies. Spacer 304 sandwiched between the two assemblies defines a flow channel for a second stream that is perpendicular in direction to the streams flowing through the two assemblies, as shown by the arrows.

Figure 4:
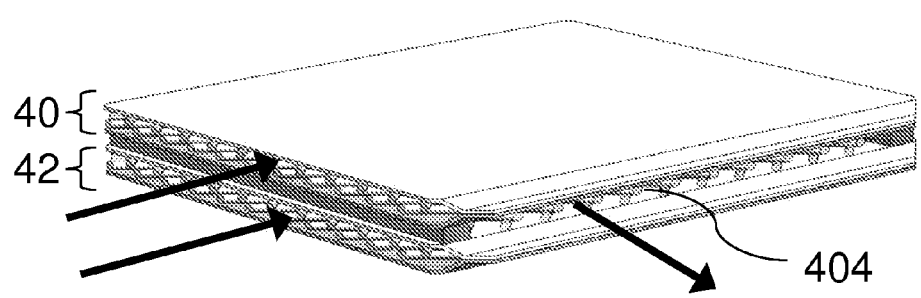
FIG. 4 is a schematic illustration of a portion of an electrical purification apparatus in accordance with one or more embodiments of the disclosure.

The resulting membrane cell stack when compressed is shown in FIG. 4. As shown, the first spacer assembly 40 and the second spacer assembly 42 are secured to one another, having spacer 404 positioned between the two spacer assemblies. The flow path through each of the spacer assemblies 40 and 42 may go in a first direction, while the flow path through the compartment defined between the two spacer assemblies may go in a second direction, as indicated by the arrows in FIG. 4.

The fluid flow in the first direction may be a diluting stream and the fluid flow in the second direction may be a concentrating stream. In certain embodiments, the fluid flow in the first direction may be converted to a concentrating stream and the fluid flow in the second direction may be converted to a diluting stream with the use of polarity reversal where the applied electrical field is reversed thus reversing the stream function.

Multiple spacer assemblies separated by spacers may be secured together to form a stack of cell pairs, or a membrane cell stack.

The electrical purification apparatus of the present disclosure may further comprise a housing that encloses the cell stack. At least a portion of the periphery of the cell stack may be secured to the housing. A frame or support structure may be positioned between the housing and the cell stack to provide additional support to the cell stack. The frame may also comprise inlet manifolds and outlet manifolds that allow the flow of liquid in and out of the cell stack. The frame and the cell stack together may provide an electrical purification apparatus modular unit. The electrical purification apparatus may further comprise a second modular unit secured within the housing. A spacer, for example, a blocking spacer, may be positioned between the first modular unit and the second modular unit. A first electrode may be positioned at an end of the first modular unit that is opposite an end in communication with the second modular unit. A second electrode may be positioned at an end of the second modular unit that is opposite an end in communication with the first modular unit.

A bracket assembly may be positioned between the frame and the housing of the first modular unit, the second modular unit, or both. The bracket assembly may provide support to the modular units, and provide for a secure attachment to the housing.

In one embodiment of the disclosure, the electrical purification apparatus may be assembled by positioning a membrane cell stack into a housing or vessel. Endplates may be provided at each end of the cell stack. Adhesive may be applied to seal at least a portion of the periphery of the cell stack to the inside wall of the housing.

Figure 5:
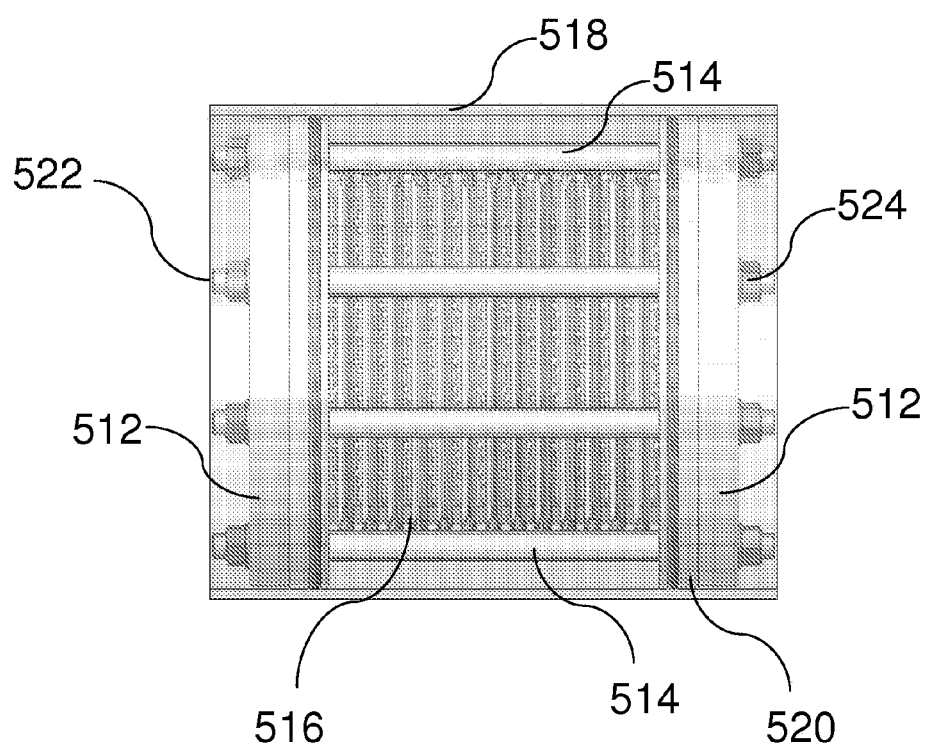
FIG. 5 is a schematic illustration of a side view of a portion of an electrodeionization apparatus comprising a membrane cell stack positioned in a housing in accordance with one or more embodiments of the disclosure.
Figure 6:
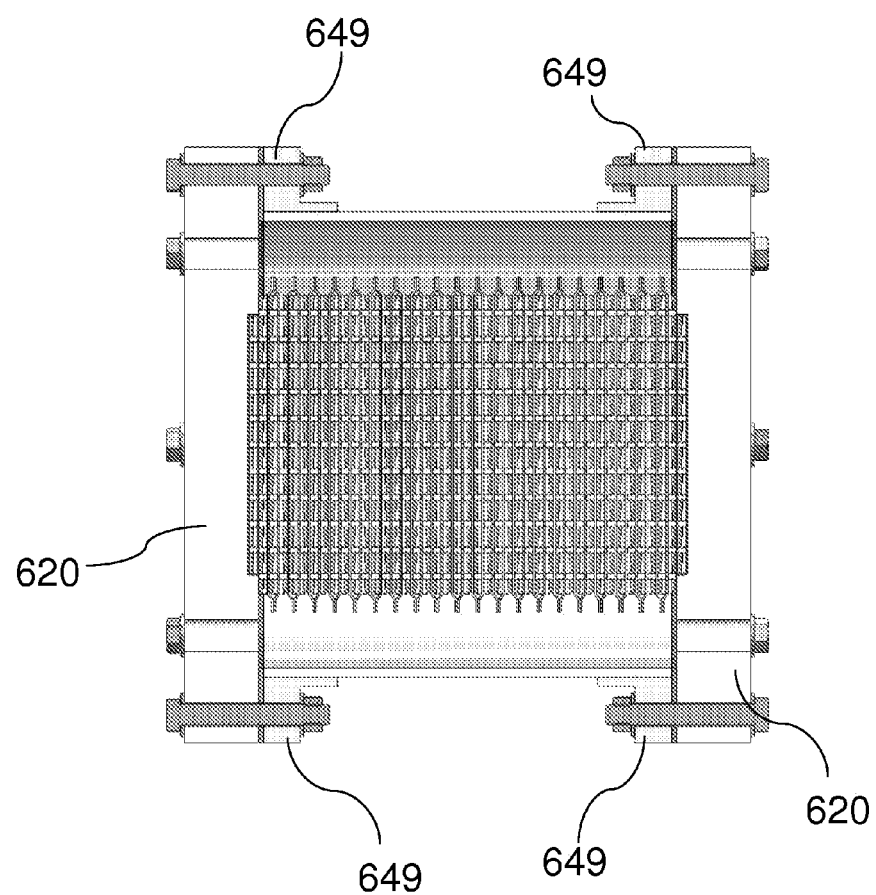
FIG. 6 is a schematic illustration of a side view of a portion of an electrodeionization apparatus comprising a membrane cell stack positioned in a housing in accordance with one or more embodiments of the disclosure.
Figure 7:
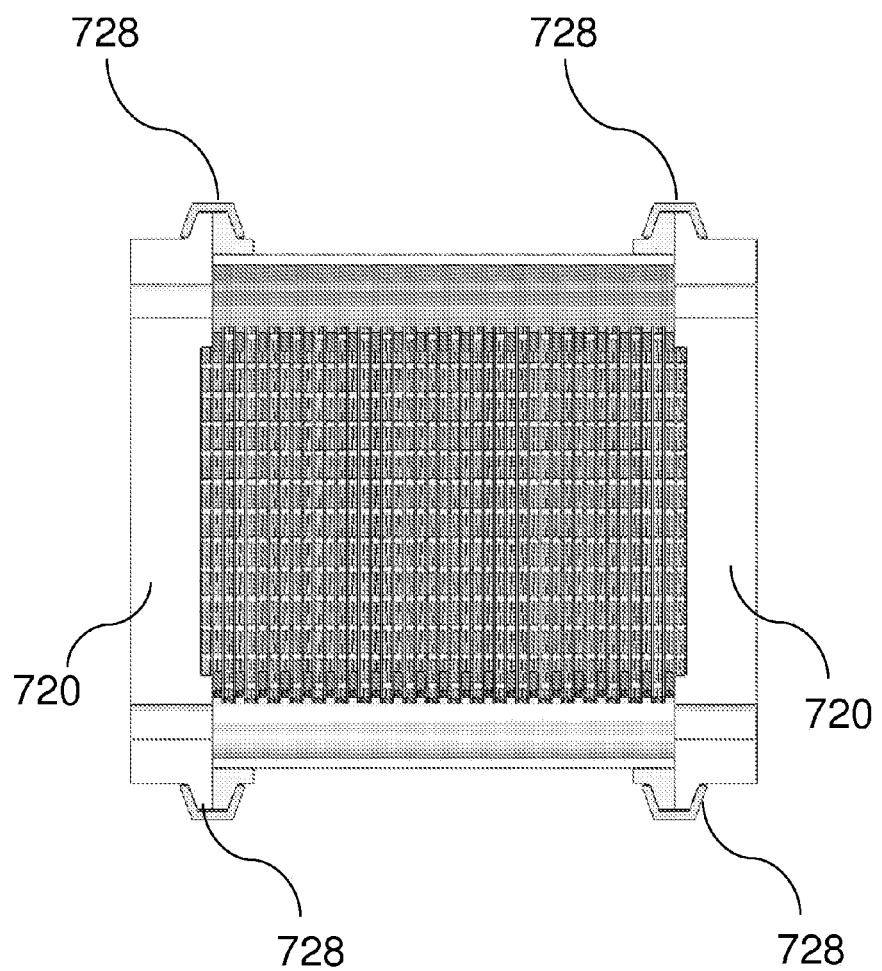
FIG. 7 is a schematic illustration of a side view of a portion of an electrodeionization apparatus comprising a membrane cell stack positioned in a housing in accordance with one or more embodiments of the disclosure.

FIG. 5 shows one embodiment of cell stack 516 is enclosed by housing 518. Endplates 512 are drawn together with tie-bars 514. Tie-bars 514 are isolated from the fluid streams by non-metallic sleeves. A non-metallic endblock 520 may be inserted between the cell stack 516 and endplate 512 at each end if endplates 512 are metallic. Endblocks 520 support the electrodes and isolate the liquid streams from the endplates. The ends of the tie-bar sleeves are sealed against endblocks 520 by O-rings. Alternatively, endplate 520 may be non-metallic, and a separate endblock may then not be necessary. As shown in FIG. 5, endplates 520 may be attached by bolts or threaded rod 522 and nuts 524. As shown in FIG. 6, endplates 620 may be attached by flanges 649. As shown in FIG. 7, endplates 720 may be attached by clamps 728, such as by Victaulic® type clamps.

In some embodiments of the disclosure, the tie-bars may be located outside the housing. In some other embodiments of the disclosure, the endplates may be secured in the housing by segmented or snap rings inserted into grooves at the ends of the housing. The endplates may also be bonded to the housing by adhesives.

A metallic endplate may be fabricated, for example, by machining or casting. A non-metallic endblock or endplate may be fabricated, for example, by machining a block of plastic or by injection molding.

Once the stack is positioned in the housing and the endblocks/endplates are secured to the housing, adhesive may be applied to seal the stack to the housing and to isolate the inlet and outlet manifolds for the two streams from each other. The housing is first oriented with the longitudinal axis horizontal.

As discussed in further detail below, adhesive properties for securing the membrane stack within the housing may be different from the adhesive properties for securing membranes to one another to form a cell stack. For securing a membrane stack in a housing, the adhesive viscosity must be low. The acceptable viscosity could be achieved by adding reactive diluents into the mixed adhesive. The primary function of a diluent is to reduce its viscosity to either make it easier to compound, or to improve application properties. Lower viscosity may also be important in achieving a suitable adhesive in that it allows greater penetration into a porous substrate and allows for wetting of non-porous surfaces. The diluent could be diglycidyl ether, diglycidyl phenyl diglycidyl ether and others.

The membrane cells flow compartments may be about 0.33 mm to 0.46 mm thick and, in certain examples, the pot may be air void free. The pot elastomer (adhesive) used to secure the cell stack to the housing should be more rigid than the side seam used to secure membranes to one another; this may be because the pot must have enough mechanical strength to withstand the weight of a membrane stack. In certain embodiments, it may be desirable if the pot did not deform under feed flow pressure.

Figure 8:
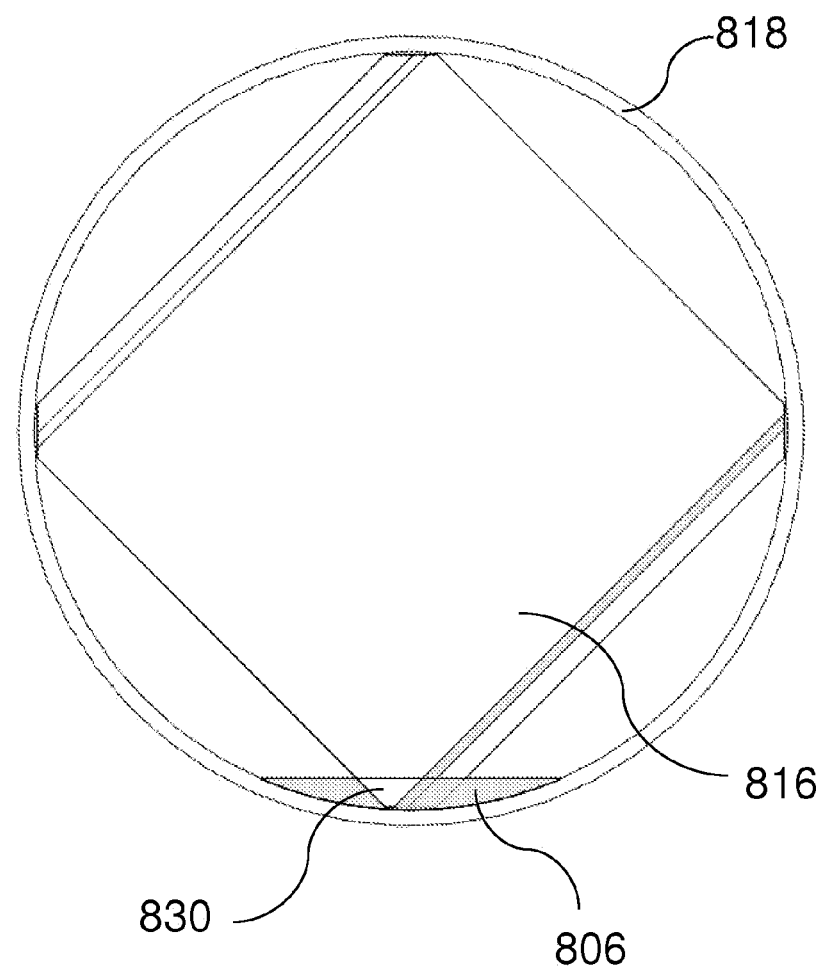
FIG. 8 is a schematic illustration of a method of securing a membrane cell stack in a housing in accordance with one or more embodiments of the disclosure.

The housing is first oriented with the longitudinal axis horizontal. FIG. 8 shows one method of applying adhesive 806 to secure cell stack 816 within housing 818. Housing 818 may be rotated so that a periphery of cell stack 816, in this embodiment, corner 830, is at the bottom. Low viscosity adhesive 806 is injected into housing 818 and allowed to pool at the bottom. Injections ports may be placed that coincide with a periphery of cell stack 816, which can be incorporated into housing 818 to facilitate injection of adhesive 806 into housing 818 to seal corners 830 of cell stack 816 to housing 818. After adhesive 806 sets, housing 818 may be rotated 90° until the next corner is at the bottom. The adhesive process is repeated until all desired peripheries of cell stack 816 have been sealed or secured. Surface preparation to improve the sealing of the housing to the stack periphery may include techniques that may disrupt the surface and increase the surface area to enhance adhesive bonding. For example, the surface preparation may comprise chemical, mechanical, electrical, or thermal surface preparation, and combinations thereof. This may include chemical etching or mechanical roughing, for example.

Figure 9:
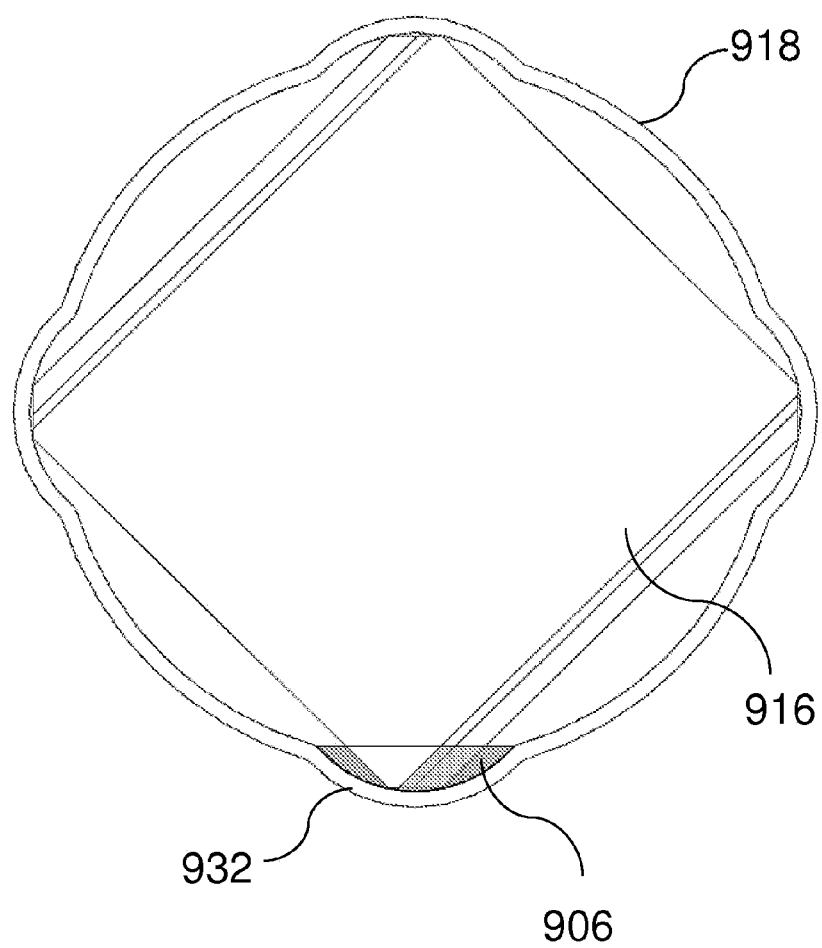
FIG. 9 is a schematic illustration of a method of securing a membrane cell stack in a housing in accordance with one or more embodiments of the disclosure.

The housing may be fabricated, by extrusion, for example, to provide a geometry that assists in securing the cell stack to the housing. For example, one or more troughs may be produced in the housing so that the adhesive may be contained in a defined area to receive a periphery of the cell stack. As shown in FIG. 9, housing 918 is provided that has scalloped troughs 932 to provide a reservoir for adhesive 906 to be placed.

In another embodiment of the disclosure, a method of applying adhesive is provided that comprises slowly rotating the housing in one direction while a controlled quantity of adhesive is injected into the housing. The adhesive continuously flows towards the lowest point and forms successive thin layers that may set to form a seal ring around inside wall of the housing. The thickness of the ring can be increased by further addition of adhesive.

In another embodiment of the disclosure a method of applying adhesive is provided that comprises rapidly rotating the housing in one direction while a controlled quantity of adhesive is injected into the housing at one or more points. The adhesive may be forced against the inside wall of the housing by centrifugal force and may forms a seal ring as it sets.

Figure 10:
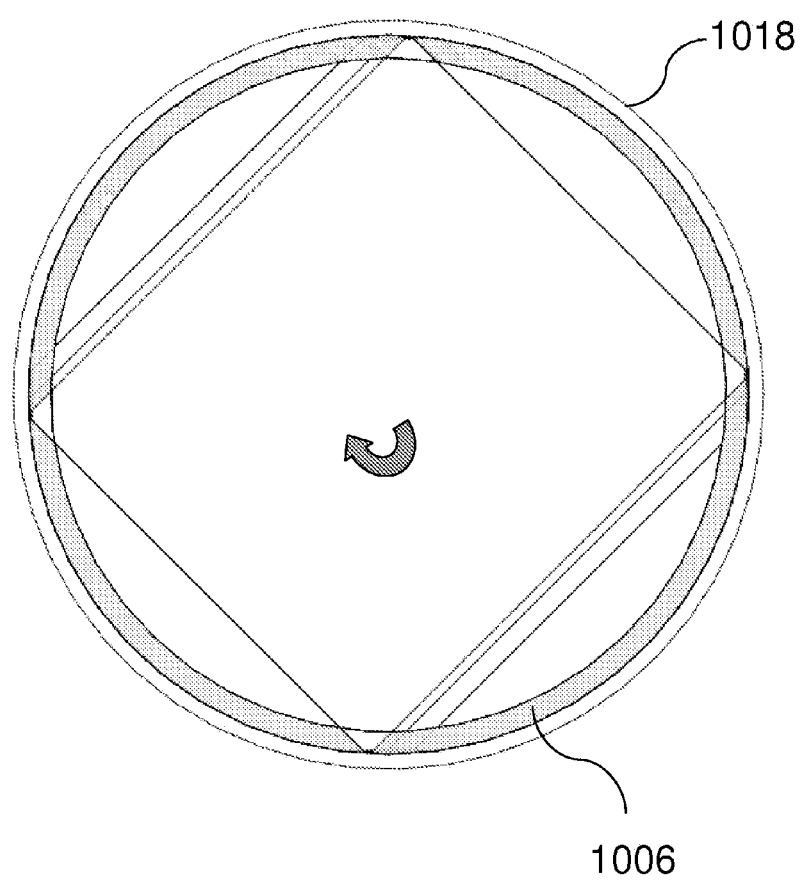
FIG. 10 is a schematic illustration of a method of securing a membrane cell stack in a housing in accordance with one or more embodiments of the disclosure.

The embodiments of the disclosure that provide a method comprising rotating a housing 1018 in one direction while injecting a controlled amount of adhesive 1006 to the housing are shown in FIG. 10.

In another embodiment of the disclosure, an electrical purification apparatus may be assembled by sealing a portion of the periphery of the cell stack with adhesive with the use of a mold. The cell stack may be inserted into a housing, and then compressed with endplates at each end of the cell stack. Adhesive may then be applied to seal a periphery of the cell stack to the inside wall of the housing.

Figure 11:
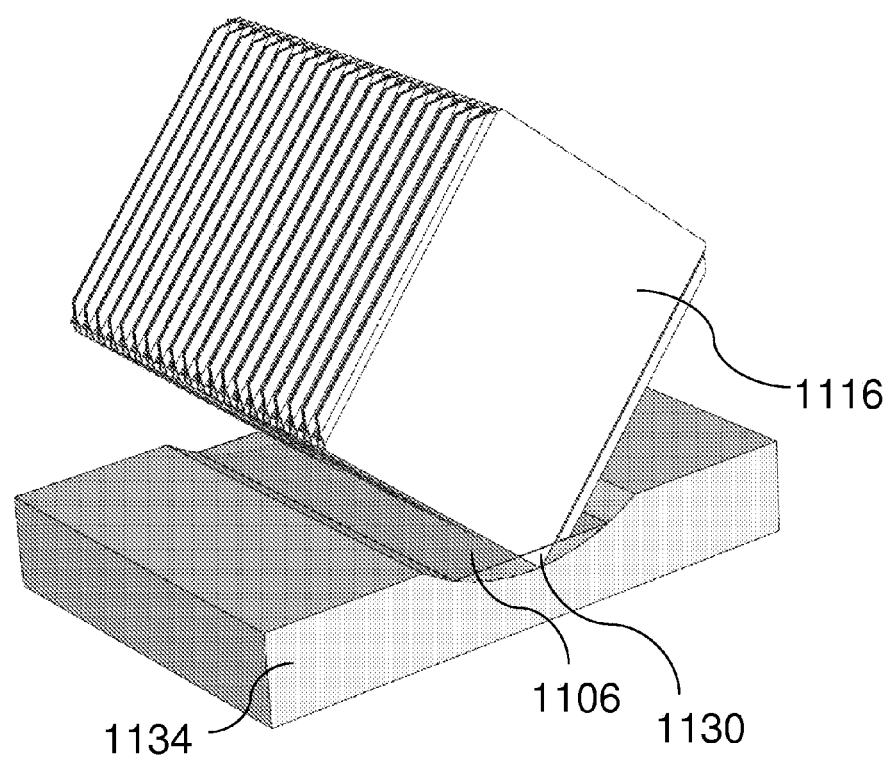
FIG. 11 is a schematic illustration of a method of securing a membrane cell stack in a housing in accordance with one or more embodiments of the disclosure.
Figure 12:
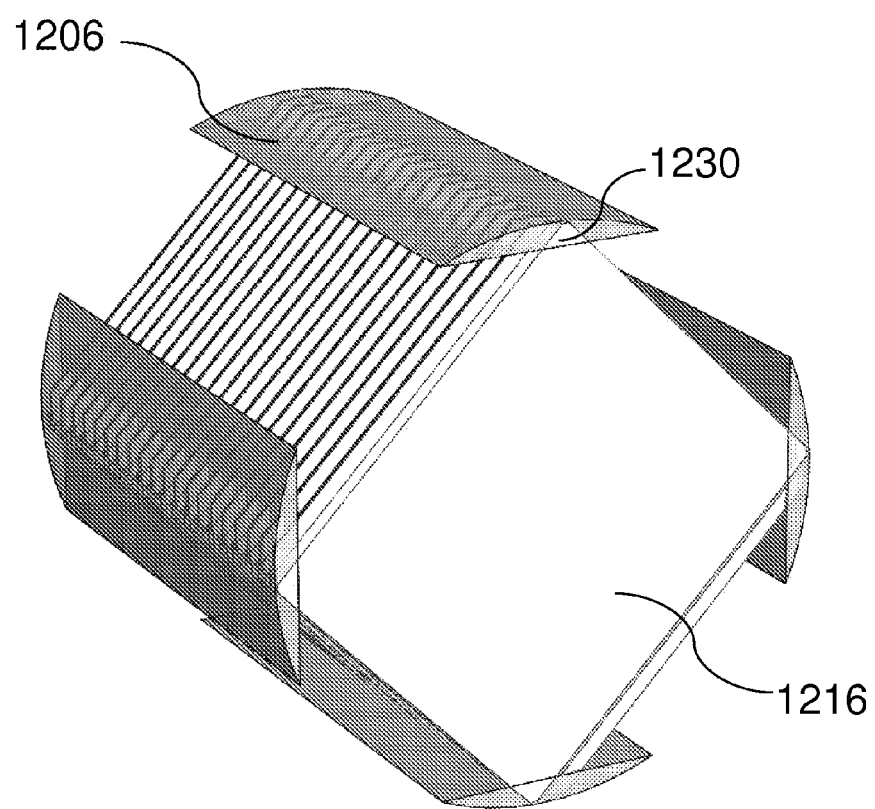
FIG. 12 is a schematic illustration of a method of securing a membrane cell stack in a housing in accordance with one or more embodiments of the disclosure.

As shown in FIG. 11, a periphery of a cell stack, in this example, corner 1130 of cell stack 1116, may be inserted into mold 1134. A low viscosity adhesive 1106 may be poured into mold 1134 and allowed to set. The stack is then rotated to seal other portions of the periphery as shown in FIG. 12, wherein adhesive 1206 is shown at each corner 1230 of cell stack 1216. In certain examples, the mold is fabricated from a material that the adhesive may not adhere to.

Figure 13:
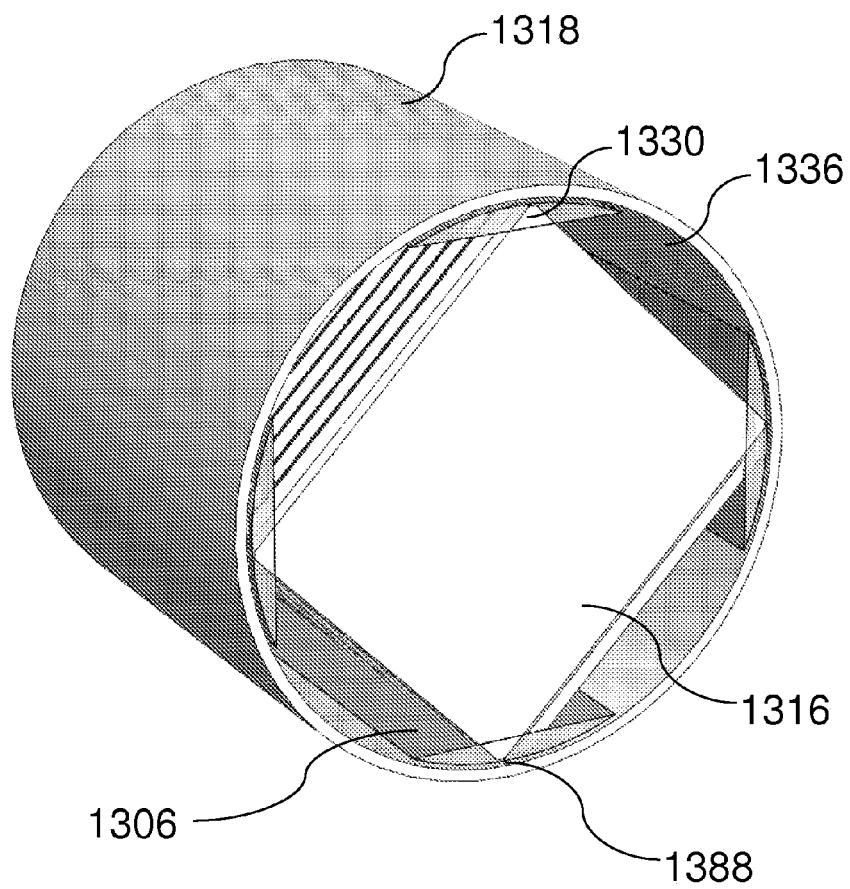
FIG. 13 is a schematic illustration of a method of securing a membrane cell stack in a housing in accordance with one or more embodiments of the disclosure.

As shown in FIG. 13, cell stack 1316 with all four corners sealed is inserted into housing 1318 with gap 1338 between the adhesive 1306 and inner wall 1336 of housing 1318. Gap 1338 is filled with additional adhesives to seal cell stack 1316 to housing 1318 and prevent cross-leak between the flow manifolds.

Figure 14:
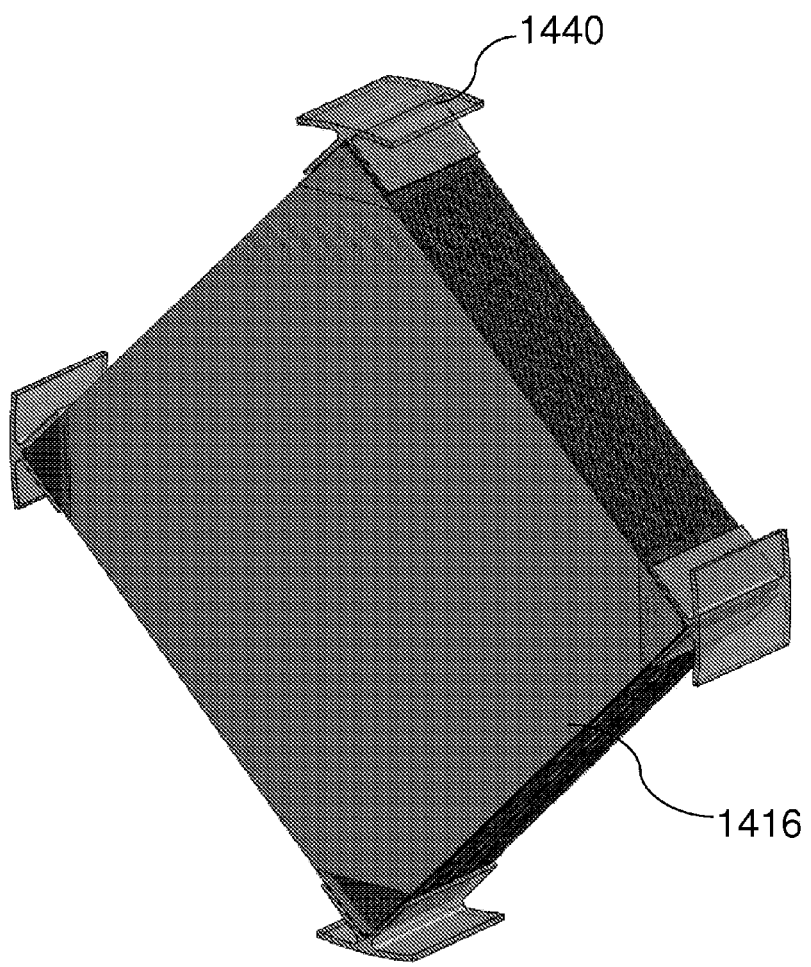
FIG. 14 is a schematic illustration of a method of securing a membrane cell stack in a housing in accordance with one or more embodiments of the disclosure.
Figure 15:
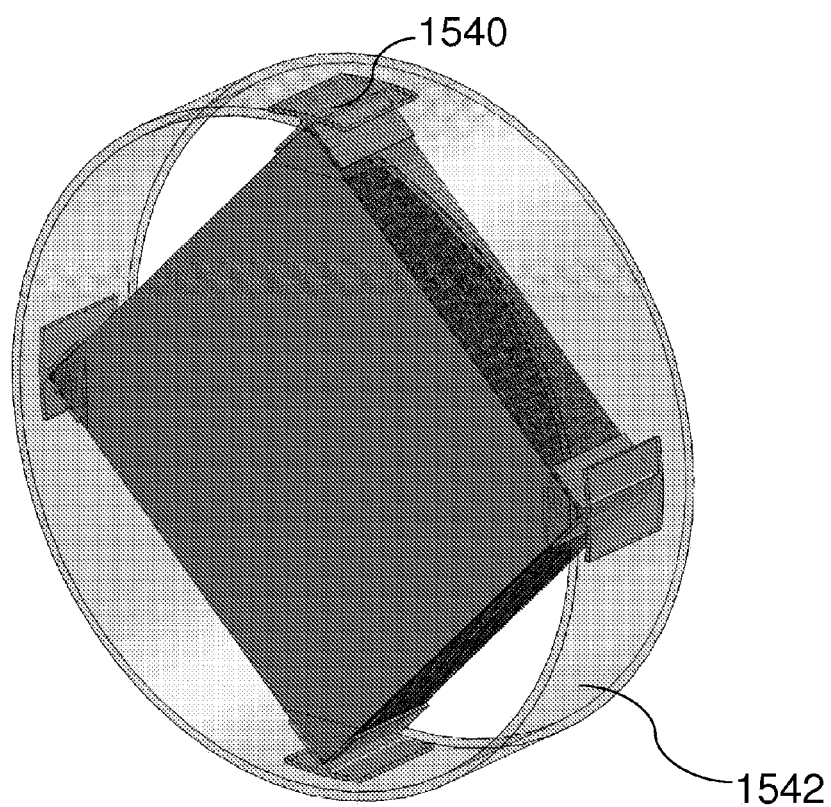
FIG. 15 is a schematic illustration of a method of securing a membrane cell stack in a housing in accordance with one or more embodiments of the disclosure.
Figure 16:
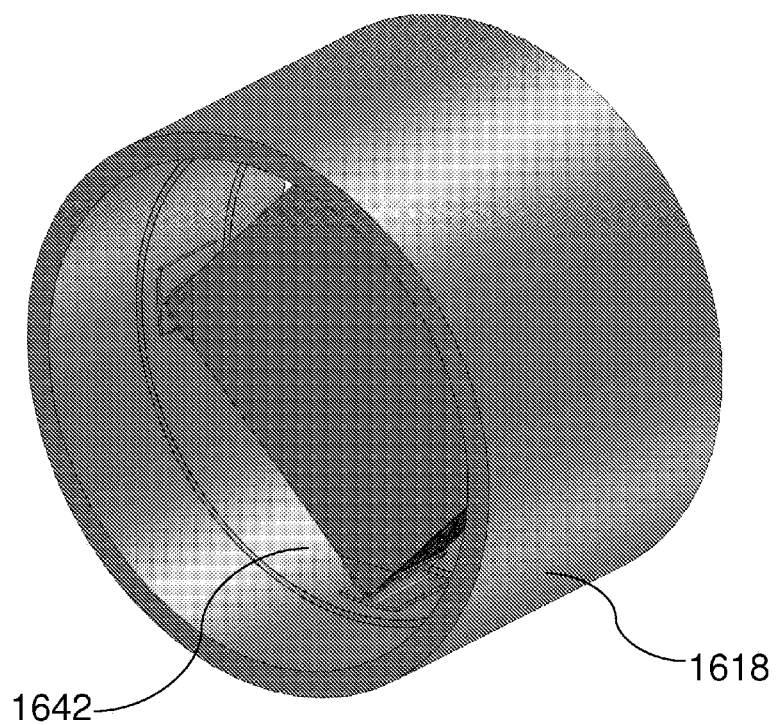
FIG. 16 is a schematic illustration of a method of securing a membrane cell stack in a housing in accordance with one or more embodiments of the disclosure.

In another embodiment illustrated in FIG. 14, membrane cell stack 1416 with bracket assembly or corner supports 1440 which may be fabricated by extrusion or injection molding, for example, are used as a mold for potting and sealing the corners of cell stack 1416. The corner supports 1440 (and 1540) then serve as anchors to attach the stack to shell 1542, as shown in FIG. 15. Methods that may be used to secure the corner supports to the shell include plastic joining techniques such as ultrasonic welding. Shell 1542 (and 1642) is in turn inserted into housing 1618 as shown in FIG. 16, thus eliminating the need to pot the stack assembly directly to the outer housing. A bracket assembly or corner support may also be used to secure a modular unit to a housing.

Figure 17:
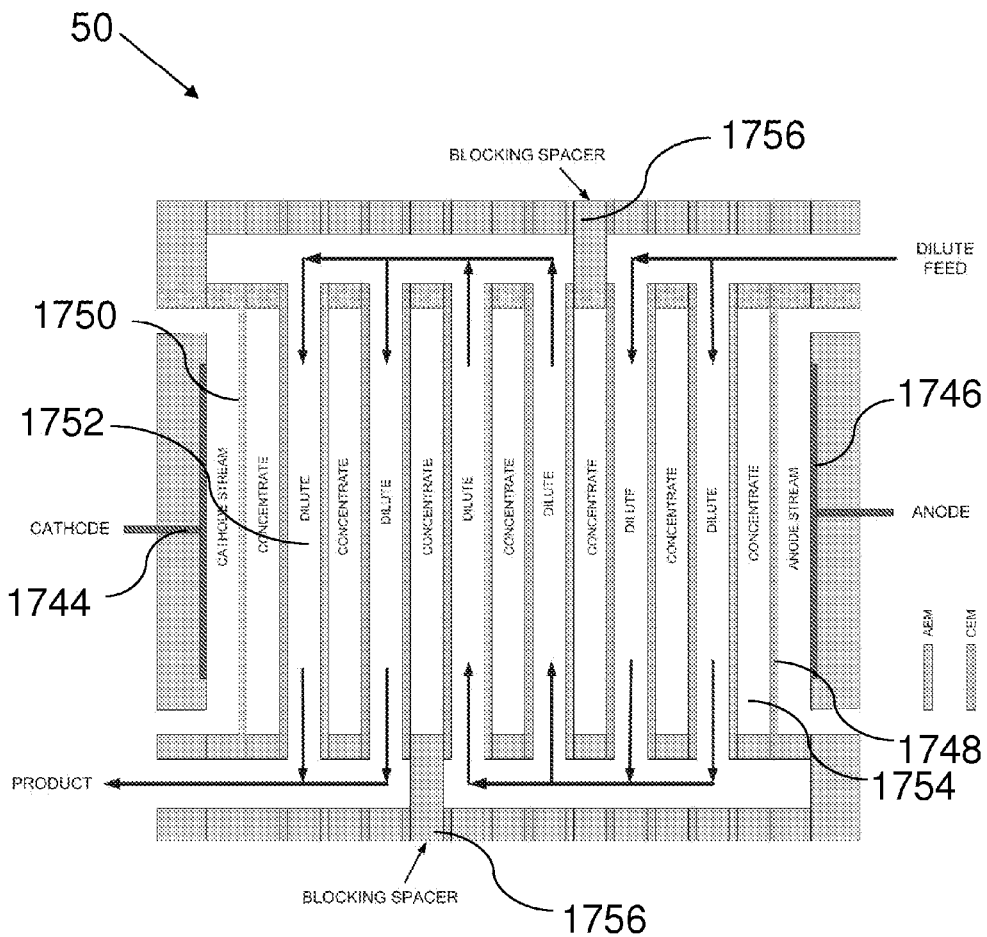
FIG. 17 is a schematic illustration of a multiple-pass electrical purification apparatus in accordance with one or more embodiments of the disclosure.

In certain embodiments of the disclosure, an electrical purification apparatus is provided that reduces or prevents inefficiencies resulting from greater electrical power consumption. The electrical purification apparatus of the present disclosure may provide for a multiple pass flow configuration to reduce or prevent current inefficiencies. The multiple pass flow configuration may reduce the bypass of current through the flow manifolds, or leakage of current, by eliminating or reducing the direct current path between the anode and the cathode of the electrical purification apparatus. As shown in FIG. 17, electrical purification apparatus 50 is provided comprising cathode 1744 and anode 1746. A plurality of alternating anion exchange membranes 1748 and cation exchange membranes 1750 reside between cathode 1744 and anode 1746 to provide a series of alternating ion diluting compartments 1752 and ion concentrating compartments 1754. Blocking spacer 1756 may be positioned within one or more of ion diluting compartments 1752 and ion concentrating compartments 1754 to redirect fluid flow and current flow through electrical purification apparatus 50, as shown by the arrows in FIG. 17.

Figure 18:
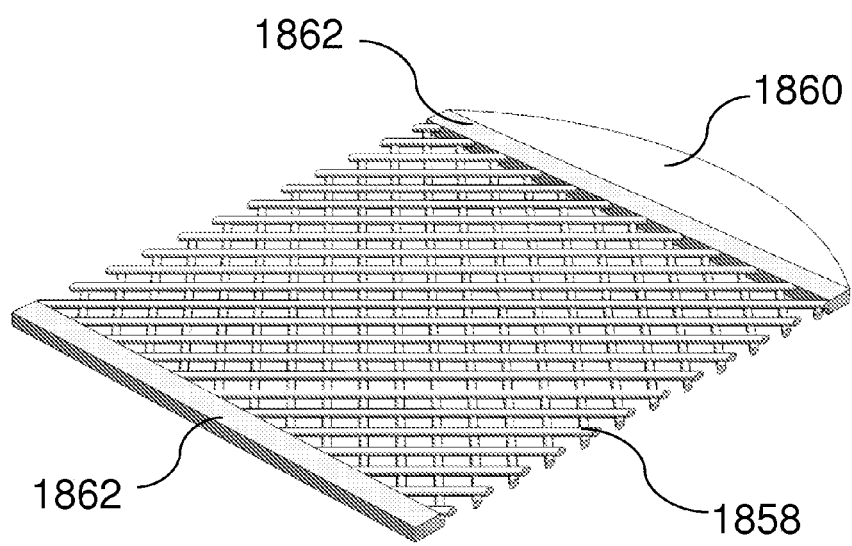
FIG. 18 is a schematic illustration of a blocking spacer in accordance with one or more embodiments of the disclosure.
Figure 19:
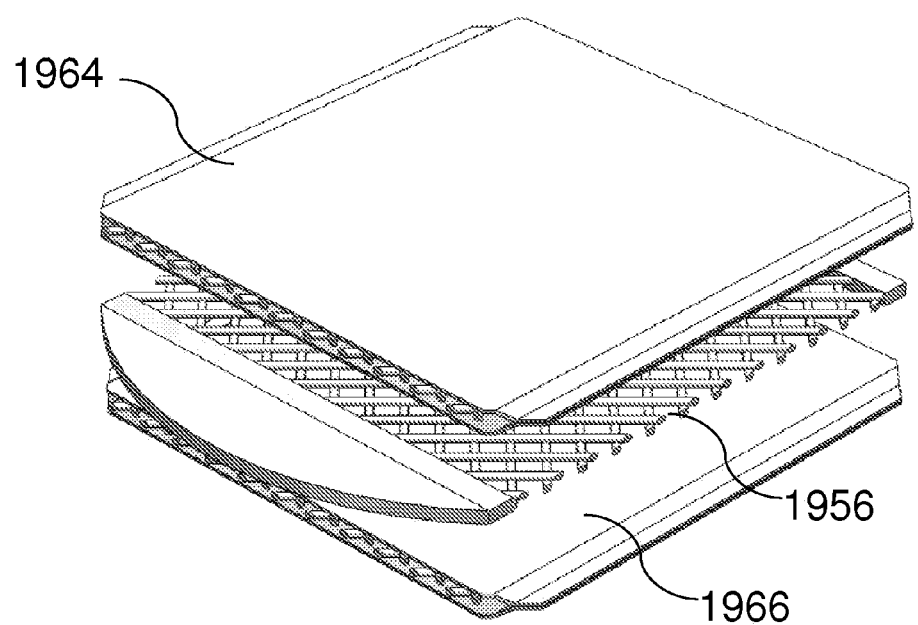
FIG. 19 is a schematic illustration of spacer assemblies and a blocking spacer positioned therebetween in accordance with one or more embodiments of the disclosure.

FIG. 18 shows an example of a spacer that may be used as a blocking spacer in an electrical purification apparatus. The spacer may comprise screen portion 1858, solid portion 1860, and sealing band 1862. Sealing band 1862 may be bonded to the adjacent membranes by adhesives, as shown in FIG. 19. The sealing bands may improve the sealing between membranes and spacer by providing a flat surface for bonding. In certain examples, the spacer may be fabricated by injection molding, machining, thermal compression, or rapid prototyping.

A molded spacer may be of sufficient thickness so that the screen portion may be molded. The thickness may be larger than that of a screen spacer. As a result the inter-membrane distance for the blocking compartment may be larger than that in the adjacent compartments, resulting in a higher electrical resistance which may be acceptable since the number of blocking spacers is limited.

The edge of the spacer at the solid portion may be secured and sealed to the inside wall of a housing. Solid portion 1860 of the spacer may be sufficiently rigid to withstand the pressure differential on the two sides. Structural features such as ribs may be added to the solid portion to increase the stiffness of the material.

As shown in FIG. 19, first spacer assembly 1964 and second spacer assembly 1966 are provided. Blocking spacer 1956 is positioned between first spacer assembly 1964 and second spacer assembly 1966.

Figure 20:
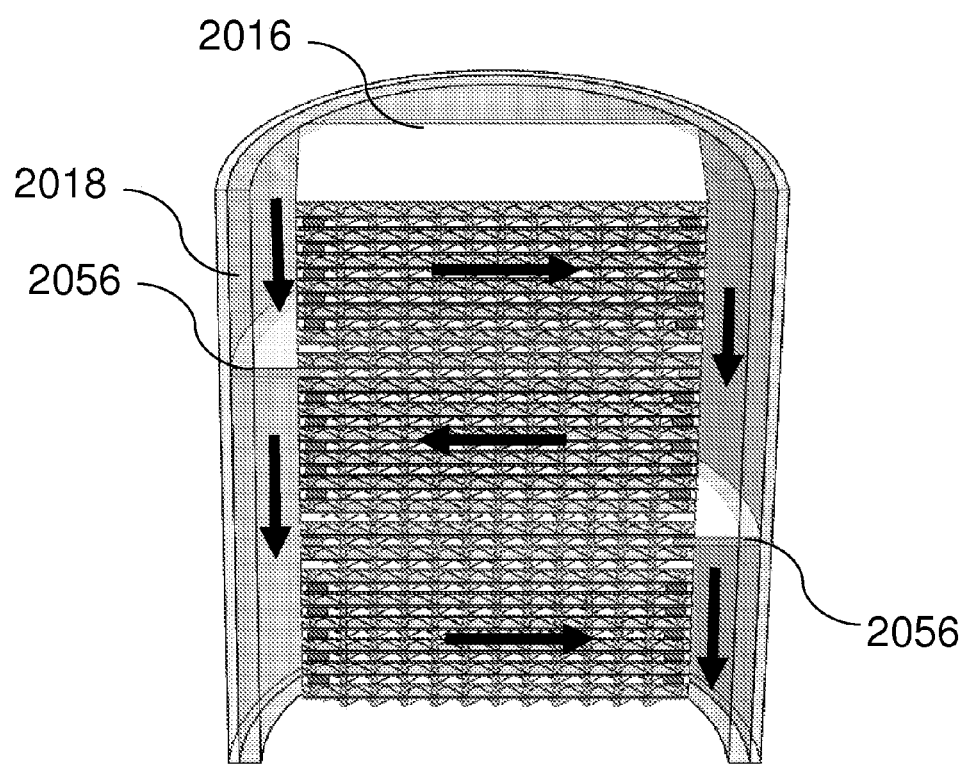
FIG. 20 is a schematic illustration of a portion of an electrical purification apparatus comprising a cell stack positioned in a housing in accordance with one or more embodiments of the disclosure.

FIG. 20 shows an embodiment of an electrical purification apparatus of the present disclosure comprising a three-pass cross-flow electrodialysis device. Cell stack 2016 is secured within housing 2018. Blocking spacers 2056 are positioned within cell stack 2016 to redirect flow of fluid and current within the electrodialysis device, as shown with the arrows in FIG. 20.

In another embodiment, a portion of the periphery of the cell stack and a periphery of the blocking spacers are secured with adhesive to the inside surface of the housing.

Figure 21:
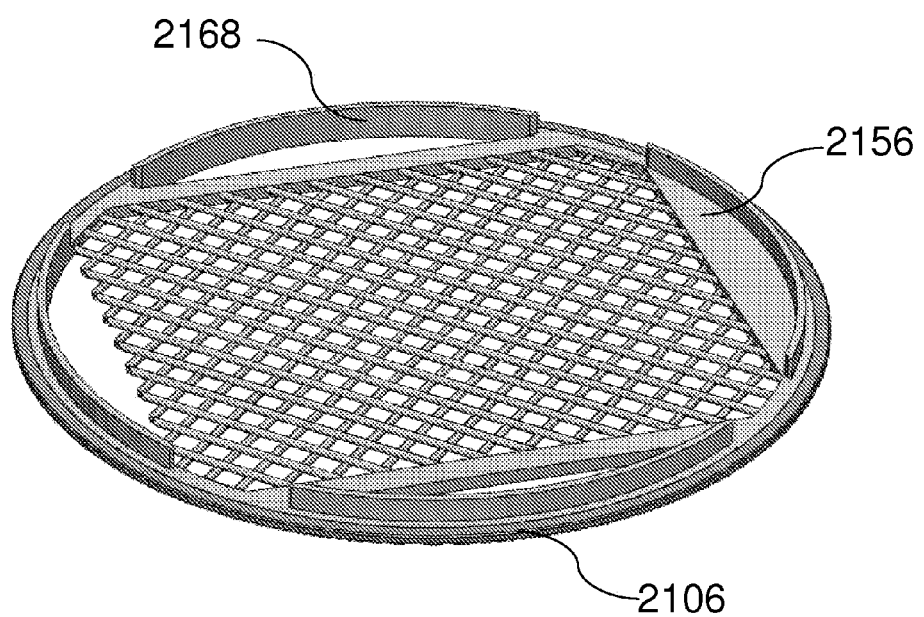
FIG. 21 is a schematic illustration of a blocking spacer in accordance with one or more embodiments of the disclosure.
Figure 22:
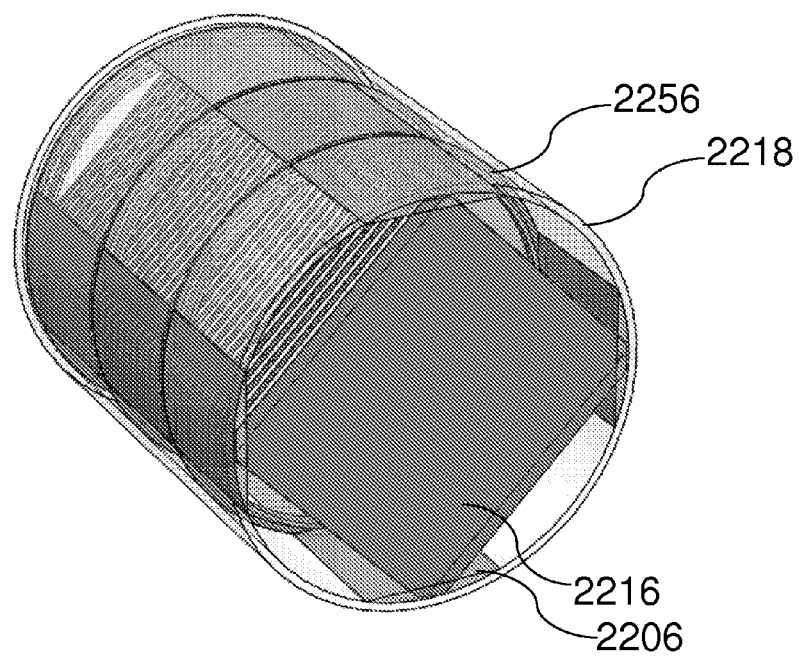
FIG. 22 is a schematic illustration of a portion of an electrical purification apparatus comprising a cell stack positioned in a housing in accordance with one or more embodiments of the disclosure.

As shown in FIG. 21, blocking spacer 2156 is provide with circular rim 2168 which forms a trough for adhesive 2106 when spacer 2156 is inserted into a housing. The device may then be assembled as shown in FIG. 22 by inserting a plurality of cell pairs 2216 and blocking spacer 2256 or spacers into housing 2218 and then compressing this assembly with endplates and/or endblocks at both ends. Adhesive 2206 may be applied successively to a portion of the periphery of the stack by potting.

Figure 23A:
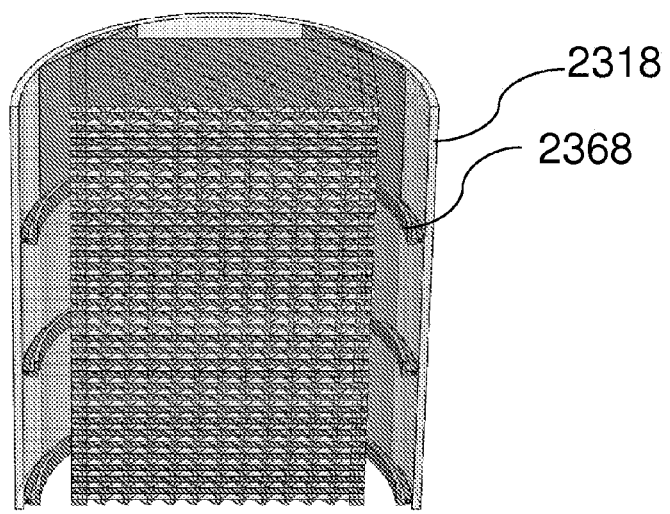
FIGS. 23A and 23B are schematic illustrations of a portion of an electrical purification apparatus comprising a cell stack positioned in a housing in accordance with one or more embodiments of the disclosure.
Figure 23A:
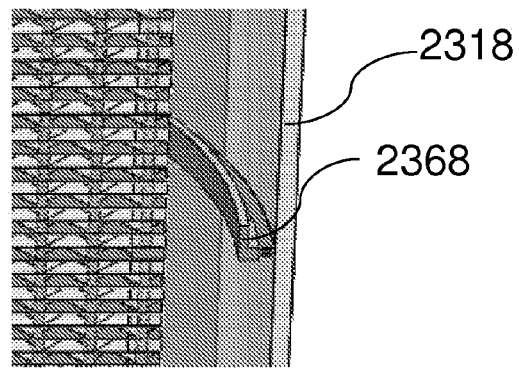
Figure 23B:
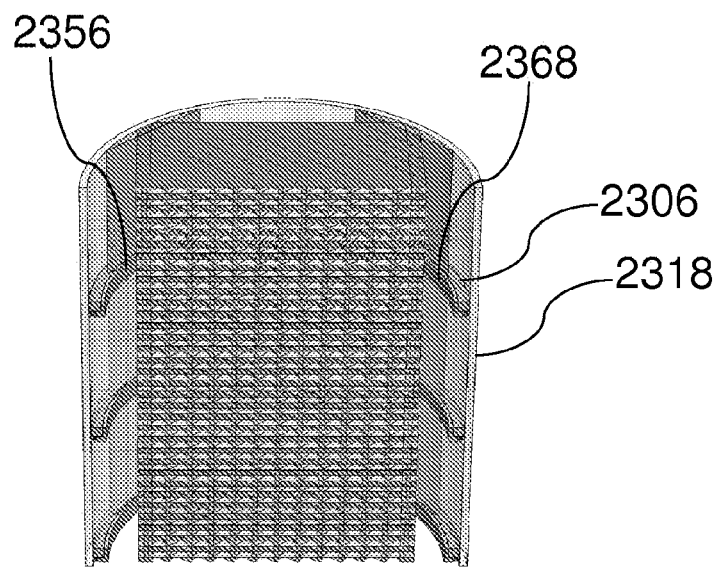
Figure 23B:
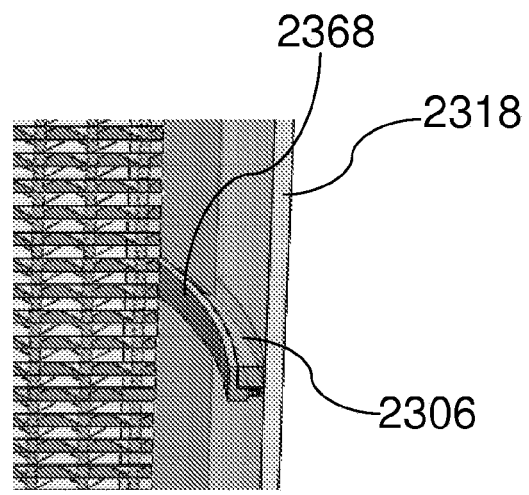

Housing 2318 is then oriented with the axis vertical as shown in FIG. 23A, with rims 2368 ready to receive adhesive. As shown in FIG. 23B, adhesive 2306 is applied to the troughs formed by rims 2368 on blocking spacers 2356 to seal the spacers to housing 2318. The adhesive can be injected through small tubes or catheters inserted through the endplate and/or endblock, for example.

In certain embodiments an additional component, such as a gasket or o-ring, may be used, and positioned around the blocking spacer to assist in containing the liquid adhesive used to secure the spacer to the housing. In this embodiment, the adhesive, once it has cured, may be the primary seal. In another embodiment, the additional component such as a gasket or o-ring is designed to be the only seal between the blocking spacer and the housing and only adhesive 2206 located at a portion of the periphery of the cell stack may be used (see FIG. 22). This may simplify modular unit assembly by reducing or eliminating the need to seal the rim of the blocking spacer to the housing with an adhesive material.

In another embodiment, stacks of cell pairs with dilute and concentrate compartments in single pass flow configurations are first sealed in sections of cylindrical housings to form modular units. The units may then be joined together with blocking spacers in between to form multiple pass configurations. An advantage of this approach may be that the stacks may be sealed to the housing sections using adhesives only at a portion of the periphery, such as the corners. The blocking spacers do not have to be sealed to the inside wall of the housing; they are instead positioned between the modular units and sealed between the ends.

Figure 24A:
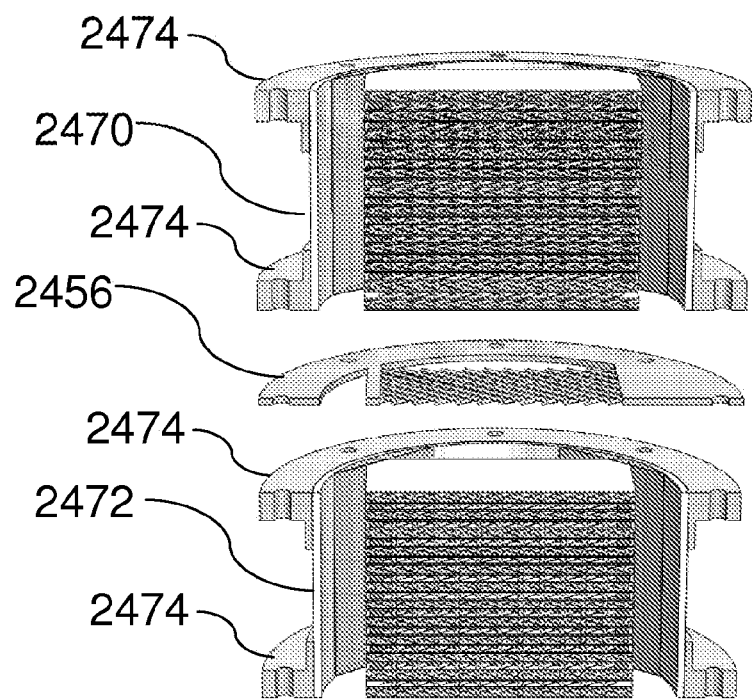
FIGS. 24A and 24B are schematic illustrations of a portion of an electrical purification apparatus comprising a first modular unit, a second modular unit, and a blocking spacer positioned therebetween in accordance with one or more embodiments of the disclosure.
Figure 24B:
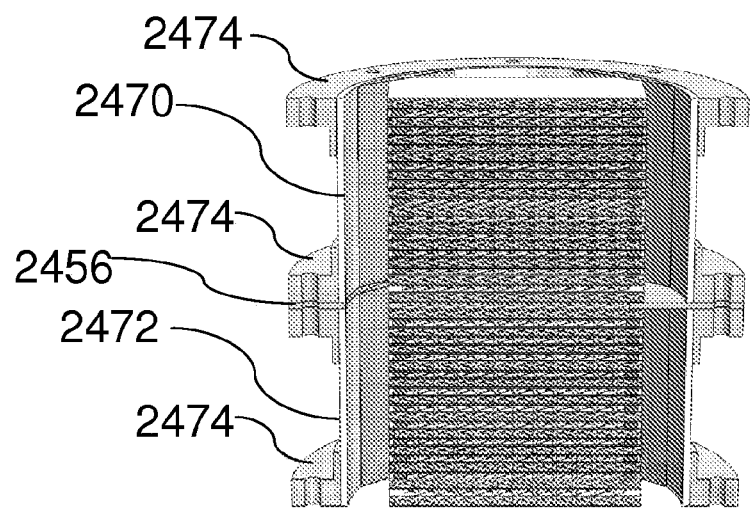

FIG. 24A shows, for example, a first modular unit 2470 and second modular unit 2472 with flanges 2474 at the ends and blocking spacer 2456 positioned in between. In FIG. 24B, first modular unit 2470 and second modular unit 2472 are secured to one another. Flanges 2474 of first modular unit 2470 and second modular unit 2472 may be secured together. In certain examples, flanges 2474 of first modular unit 2470 and second modular unit 2472 may be bolted together.

Figure 25:
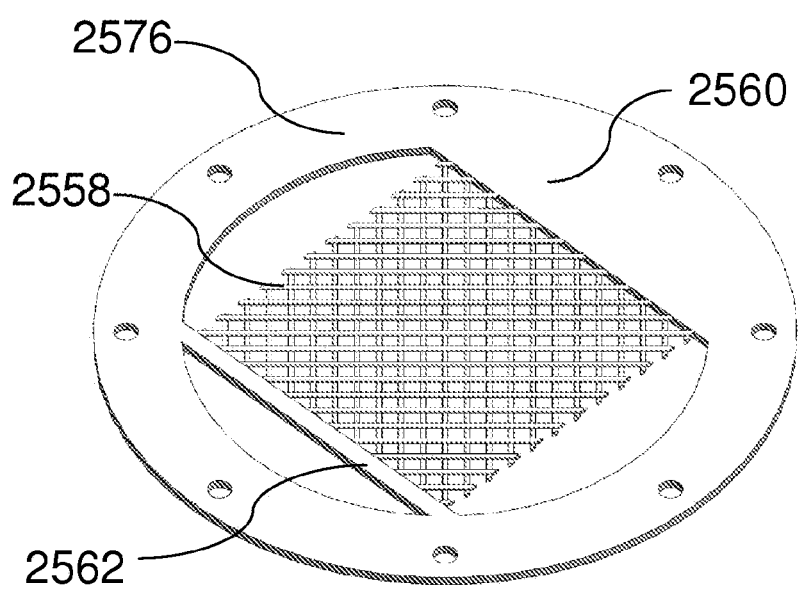
FIG. 25 is a schematic illustration of a blocking spacer in accordance with one or more embodiments of the disclosure.

FIG. 25 shows another embodiment of a blocking spacer having screen portion 2558, solid portion 2560, and sealing band 2562. The blocking spacer may be molded with circular frame 2576 that is sealed between the flanges with adhesives or gaskets. Alternatively the frame can be molded of a thermoplastic material so that adhesives or gaskets are not necessary. Other methods for fabricating blocking spacers will be apparent to those skilled in the art.

Alternatively, the modular units can be connected together with clamps, tie-bars or other securing techniques. The design of the blocking spacer may be modified accordingly to accommodate the selected securing technique.

In some embodiments of the disclosure, a method for preparing a cell stack is provided. A first spacer assembly may be prepared by securing a first ion exchange membrane to a second ion exchange membrane at a first portion of the periphery. At a second portion of the first ion exchange membrane and the second ion exchange membrane, the periphery may be folded to provide end folds. A spacer may be provided between the first ion exchange membrane and the second ion exchange membrane. A second spacer assembly may be prepared similarly. The end folds of the first spacer assembly may be aligned with the end folds of the second spacer assembly so that the end folds of the second ion exchange membrane are secured to the end folds of an ion exchange membrane of the second spacer assembly. The end folds may then be collapsed, and a spacer may be positioned between the spacer assemblies. As the spacer assemblies are compressed, compartments are created to provide for a fluid flow stream between the spacer assemblies in a direction different than the fluid flow stream within each of the first spacer assembly and the second spacer assembly.

Figure 26:
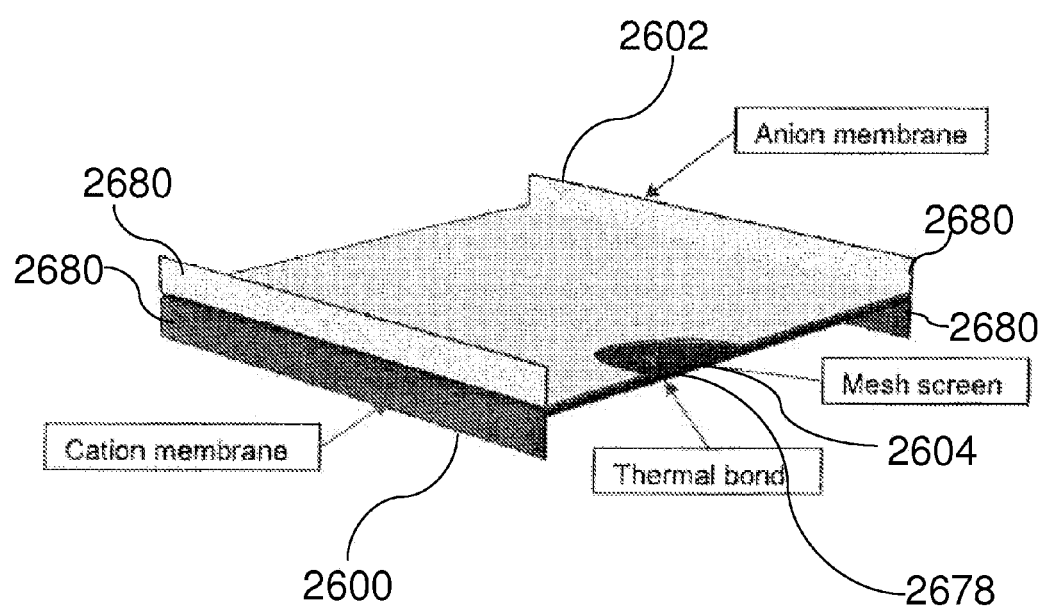
FIG. 26 is a schematic illustration of a spacer assembly in accordance with one or more embodiments of the disclosure.

As shown in FIG. 26, a first spacer assembly may be prepared by securing first anion exchange membrane 2602 to first cation exchange membrane 2600 at a first portion of the periphery. In this example, the first portion of the periphery is secured by thermal bond 2678. At a second portion of the first anion exchange membrane and the first cation exchange membrane, the periphery may be folded to provide end folds 2680. Spacer 2604 may be provided between first anion exchange membrane 2602 and first cation exchange membrane 2600.

Figure 27:
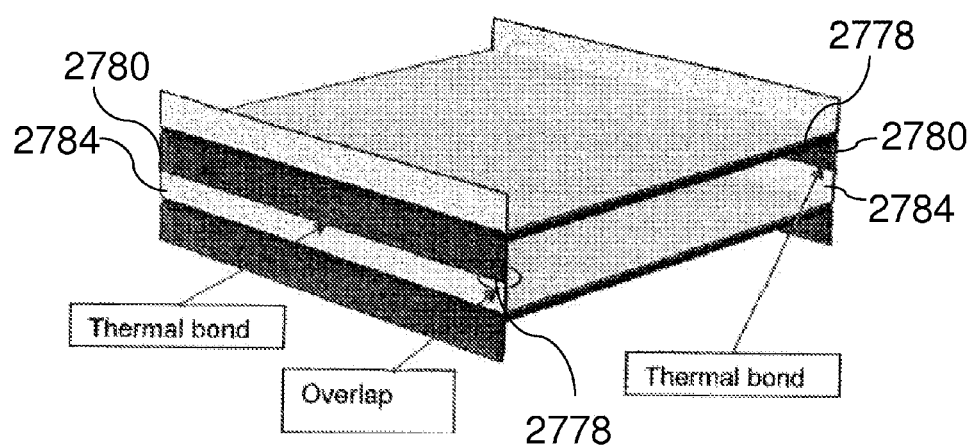
FIG. 27 is a schematic illustration of a cell stack in accordance with one or more embodiments of the disclosure.
Figure 28:
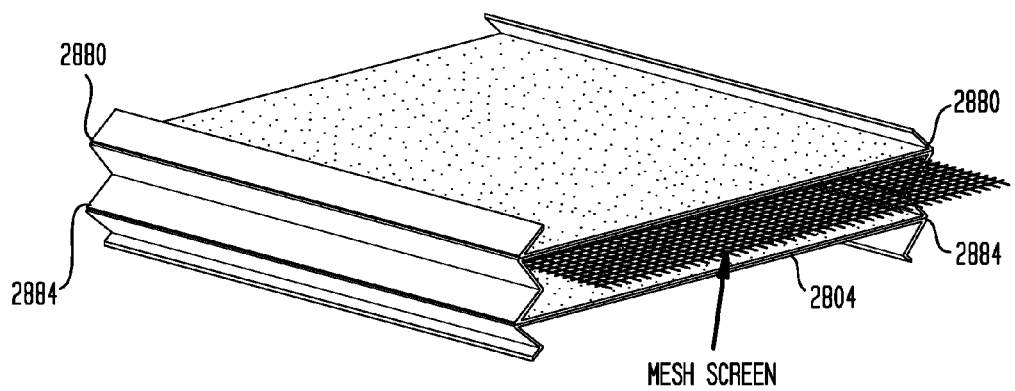
FIG. 28 is a schematic illustration of a cell stack in accordance with one or more embodiments of the disclosure.
Figure 29:
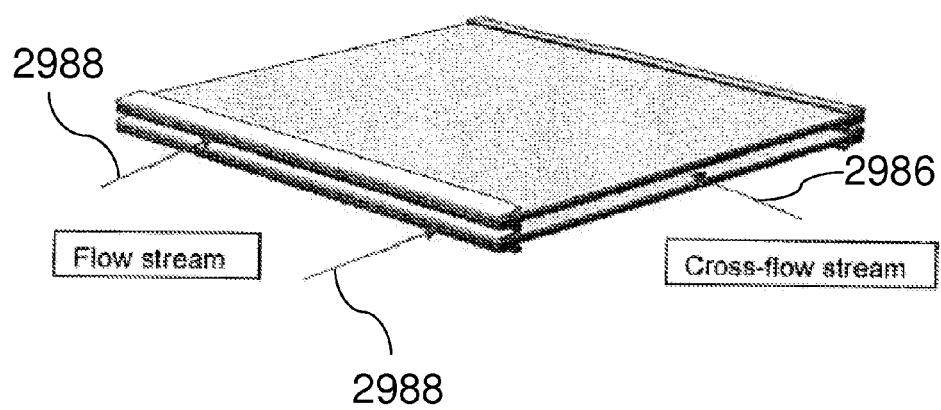
FIG. 29 is a schematic illustration of a cell stack in accordance with one or more embodiments of the disclosure.

A second spacer assembly may be prepared similarly. As shown in FIG. 27, end folds 2780 of the first spacer assembly may be aligned and may overlap with end folds 2784 of the second spacer assembly so that the end folds of the first cation exchange membrane is secured to the end folds of the anion exchange membrane of the second spacer assembly. The overlapping portion of the end folds may secured by thermal bonding, adhesives, or mechanical techniques. As shown in FIG. 28, the end folds may then be collapsed, and spacer 2804 may be positioned between the spacer assemblies. As the spacer assemblies are compressed, compartments are created to provide for fluid flow stream 2986 between the spacer assemblies in a direction different than fluid flow stream 2988 within each of the first spacer assembly and second spacer assembly as shown in FIG. 29 by the arrows.

By using thermal bonding techniques to prepare the spacer assemblies and the resultant cell stack, a process is provided that may allow for ease of assembly, and may provide for faster overall assembly time of an electrical purification apparatus. The narrow thermal seals provide for larger flow channels that may result in higher membrane utilization, which may increase the efficiency of the overall electrical purification apparatus. In certain embodiments utilizing thermal bonding, additional re-enforcement strips of a polymeric material, for example, polypropylene or polyethylene, may be used to strengthen the thermal bonding areas and to provide a more robust seal. By thermal bonding the membranes prior to collapsing and compressing the membranes, may also assist in ease of assembly, as there may be more room for the appropriate bonding equipment and devices to assist in the bonding process. The thermal bonding techniques may also prevent leaks in the membrane stack. This process may also reduce the compressive force to membrane spacers to maintain the cell stack integrity, resulting in a lower pressure drop through the modular unit.

In some embodiments, adhesives may be used to secure the ion exchange membranes and spacers in a cell stack. Adhesives that may be useful in preparing a cell stack may have particular characteristics or properties that allow for a suitable seal of the components of the cell stack and to secure the cell stack within an electrical purification apparatus housing. These properties may include the adhesive's viscosity, gel time, cure temperature and elastomeric properties. By modifying the properties of the adhesive, it has been found that the bond strength between the membrane stack and the housing may be enhanced, and the leakages within the electrical purification apparatus may be reduced or eliminated.

In some cases epoxy or epoxy-based materials or polyurethane or polyurethane-based materials may be used. This may be due to their thermal, mechanical, and chemical properties that may allow them to provide suitable sealing of membranes to one another, and to cell stacks to housings.

The epoxy or epoxy-based material may comprise a resin and a curing agent. To provide suitable sealing to the membranes or to the housing, the resin may require crosslinking. This crosslinking may be achieved by chemically reacting the resin with a suitable curing agent. The curing agent may be selected from the group consisting of aliphatic amines, amindoamine, cycloaliphatic amine, and aromatic amine. The curing agents may provide particular properties to the adhesive, including, but not limited to, viscosity, pot life, curing time, penetration, wetting ability, mechanical strength, and chemical resistance after curing.

The polyurethane or polyurethane-based materials may be produced by the poly addition reaction of an isocyanine with a polyalcohol (polyol) in the presence of a catalyst. The reaction may provide a polymer containing urethane linkage, —RNHCOOR'—.

When an adhesive is desired that is suitable to use to secure membranes to one another, in some embodiments, it may be desirable that the adhesive remain to a certain extent on a predetermined glue line or seal band. If, for example, the viscosity of the adhesive is too low, the adhesive may run or drip off from the glue line or seal band. If the adhesive viscosity is too viscous, spreading of the adhesive may become too difficult.

In certain embodiments, it may be desirable to use an adhesive that has a similar thermal expansion as the membrane to secure the membranes to one another. This may prevent or reduce cracks or wrinkles at the membrane-adhesive interface. In order to determine a suitable adhesive for electrical purification apparatus applications, the concentration of amine curing agent may be altered. For example, aliphatic amine has a straight carbon backbone chain, which may provide a high degree of flexibility for thermal expansion. Use of this type of curing agent may allow the side seam to expand along with the membrane. Cycloaliphatic and aromatic amine curing agents have aromatic rings in their back bone chain, which may provide rigid elastomer properties.

In certain embodiments of this disclosure, adhesives that may be used to secure membranes to one another may have a viscosity in a range from about 1000 to about 45,000 cps at ambient temperature may be used. This may provide a gel time in a range from about 15 minutes to about 30 minutes. The adhesive may have a shore D hardness in a range from about 30 to about 70 at ambient temperature.

The adhesive may be applied by any suitable means, and it may be applied by an automated or manual procedure. The seam that the adhesive creates may have a width in a range of about 0.25 inches to about 1.5 inches, and a glue thickness in a range of about 20 mils to about 50 mils. The adhesive may be cured by using ultraviolet light, ambient temperature, accelerated temperature, or the like.

Adhesives that may be use for securing a membrane cell stack to a housing may have a low viscosity, which may be achieved by adding reactive diluents into the mixed adhesive. By adding a diluent, a lower viscosity adhesive may be obtained, and may allow for easier application of the adhesive. The lower viscosity may also provide a greater penetration into a porous substrate and better wetting on a non-porous surface. In certain examples, the diluent may be selected from the group consisting of diglycidyl ether, diglycidyl phenyl diglycidyl ether, and combinations thereof.

The adhesive used to secure the cell stack to the housing may be more rigid than the adhesive used to secure the membranes to one another. The adhesive used to secure the cell stack to the housing may be formulated to have enough mechanical strength to withstand the weight of the membrane cell stack, and may not deform under flow pressure.

In certain embodiments of this disclosure, the adhesive used to secure the cell stack to the housing may have a viscosity in the range from about 300 cps to 2000 cps at ambient temperature. Gel time of the adhesive may range from about 30 minutes to about 60 minutes. The adhesive may have a shore D in a range of about 45 to 80 at ambient temperature.

The housing in which the membrane cell stack is positioned and secured to provide the electrochemical purification apparatus may be made of any suitable material to allow for fluid flow and current flow within the apparatus, and to retain fluid and current within it. For example, the housing or housing may be constructed of polysulfone, polyvinylchloride, polycarbonate or epoxy impregnated fiberglass. The materials used for the housing may produced from an extrusion process, injection molding, or other process that typically provides a dense structure with a generally smooth interior. To enhance the adhesive bond between the housing and the membrane cell stack, which may fail due to forces of continuous fluid flow, a portion of the interior surface of the housing where the membrane cell stack may be secured is treated or modified. Surface preparation to improve the sealing of the housing to the stack periphery may include techniques that may disrupt the surface and increase the surface area to enhance adhesive bonding. For example, the surface preparation may comprise chemical, mechanical, electrical, or thermal surface preparation, and combinations thereof. This may include chemical etching or mechanical roughing, for example.

In certain embodiments, adhesive injection ports in the housing are used to aid in the delivery of adhesive to the desired areas in the housing in order to secure the membrane cell stack to the housing. One or more adhesive injection ports may be used to introduce the adhesive to the housing. More than one adhesive port may be utilized at each securing point in the housing. In certain embodiments, three adhesive injection ports may be provided in a particular arrangement to distribute adhesive in the appropriate manner to the securing point. The adhesive injection ports may be positioned in a straight line, or may be scattered in a particular design or pattern to achieve the desired adhesive delivery. In examples where a low viscosity adhesive is used, it may penetrate into the channels of the membrane cell stack to enhance the bond between the membrane cell stack and the housing. By injecting adhesive in this manner, the amount of adhesive that is being used and the exothermic heat generated by the adhesive may be monitored.

In certain embodiments of this disclosure, the membranes may be secured to one another and to spacers within the membrane cell stack by mechanical sealing techniques. The sealing may be accomplished by the formation of ridges or grooves on at least one of the membranes and the spacers used in the electrical purification apparatus. The ridges or grooves on a first membrane or spacer may mate with the ridges or grooves on a second membrane or spacer. The ridges or groove on a first membrane or spacer may interlock with the ridges or grooves on a second membrane or spacer. For example, the ridges or grooves on a first membrane or spacer may be male ridges or fittings that mate with the ridges or groves on the second membrane or spacer, which may be female ridges or fittings. An ion exchange membrane such as a cation exchange membrane or an anion exchange membrane may be positioned and secured between the first spacer and the second spacer. In certain embodiments, once a series of spacers and ion exchange membranes has been assembled to form a plurality of concentrate and dilute flow compartments, the compartments may be filled with a resin, in the form of a resin slurry or resin suspension, for example.

Figure 30:
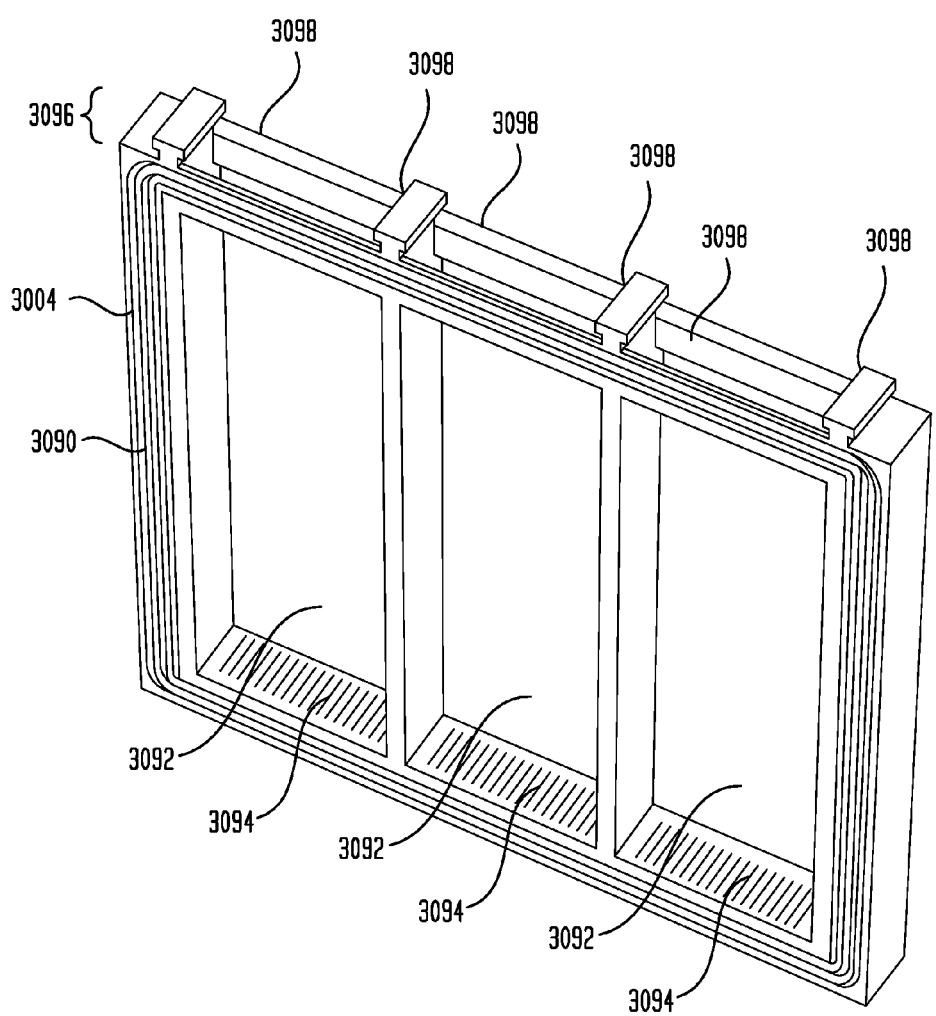
FIG. 30 is a schematic illustration of a spacer in accordance with one or more embodiments of the disclosure.

FIG. 30 shows an example of an injection molded dilute spacer 3004 with grooves 3090 for mating seals on both faces of spacer 3004. One end of each flow compartment 3092 is closed off with the exception of openings 3094 that retain ion exchange resin beads, but may allow fluid flow. The other end 3096 of spacer 3004 may be open for resin filling. Slots 3098 may be present at the end to accommodate resin retaining plates. A concentrate spacer may be constructed in the same manner. In certain examples, the concentrate spacer may be thinner than the dilute spacer because in certain embodiments, the concentrate flow may be lower than the flow through the dilute compartments.

Figure 31:
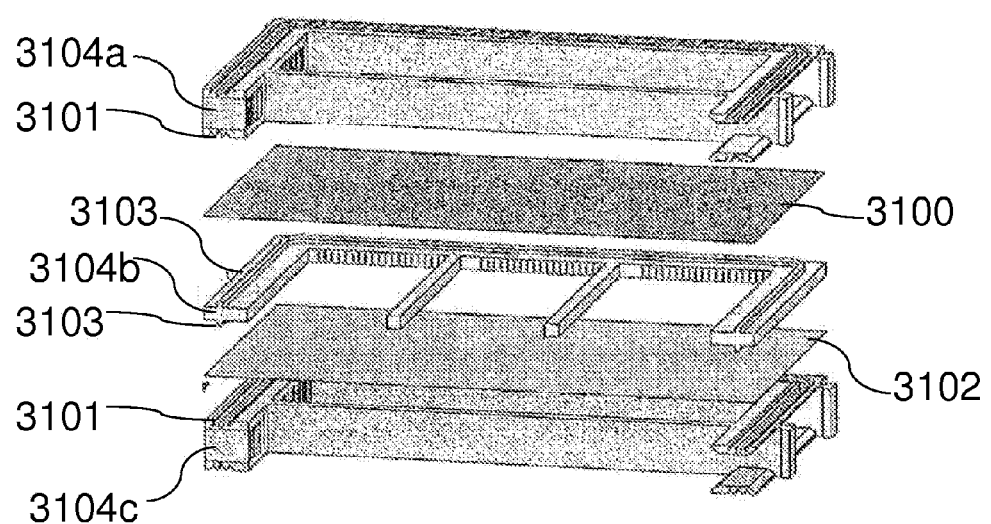
FIG. 31 is a schematic illustration of an exploded view and through of cell stack of spacers and membranes in accordance with one or more embodiments of the disclosure.

FIG. 31 shows a cross-sectional view through a stack of spacers 3104 and cation exchange membrane 3100 and anion exchange membranes 3102 prior to assembly. Female features 3101 on first spacer 3104a may be mated with the male features 3103 on second spacer 3104b. Male features 3103 on second spacer 3104b may also be mated with the female features 3101 on third spacer 3104c.

To enhance the transfer of ions through the resin beads and the membranes, it may be desirable to have the resin beads tightly packed. This may be particularly advantageous in the dilute compartments in ultrapure water applications. It has been found that there are many possible ways to increase the packing density. For example, resins may be soaked in a concentrated salt solution, such as sodium chloride, and then slurried into the compartments. During operation of the electrical purification apparatus, the resins in the dilute compartments may swell as the dilute stream is deionized. The resins may also be soaked in a concentrated salt solution, such as sodium chloride, and then dried. The resins may then be suspended in an air stream and then blown into the compartments. During operation, the resins in both the dilute and concentrate compartments may swell as they are exposed to fluid, and the resins in the dilute compartments will swell further as the dilute stream is deionized. In another example, the concentrate compartments may be filled before the dilute compartments. The membranes will be allowed to bulge into the dilute compartments, and then the dilute compartments may be filled. Expansion of the resins in the dilute compartment during operation may be constrained by the resins packed into the concentrate, thereby increasing the packing density.

Figure 32:
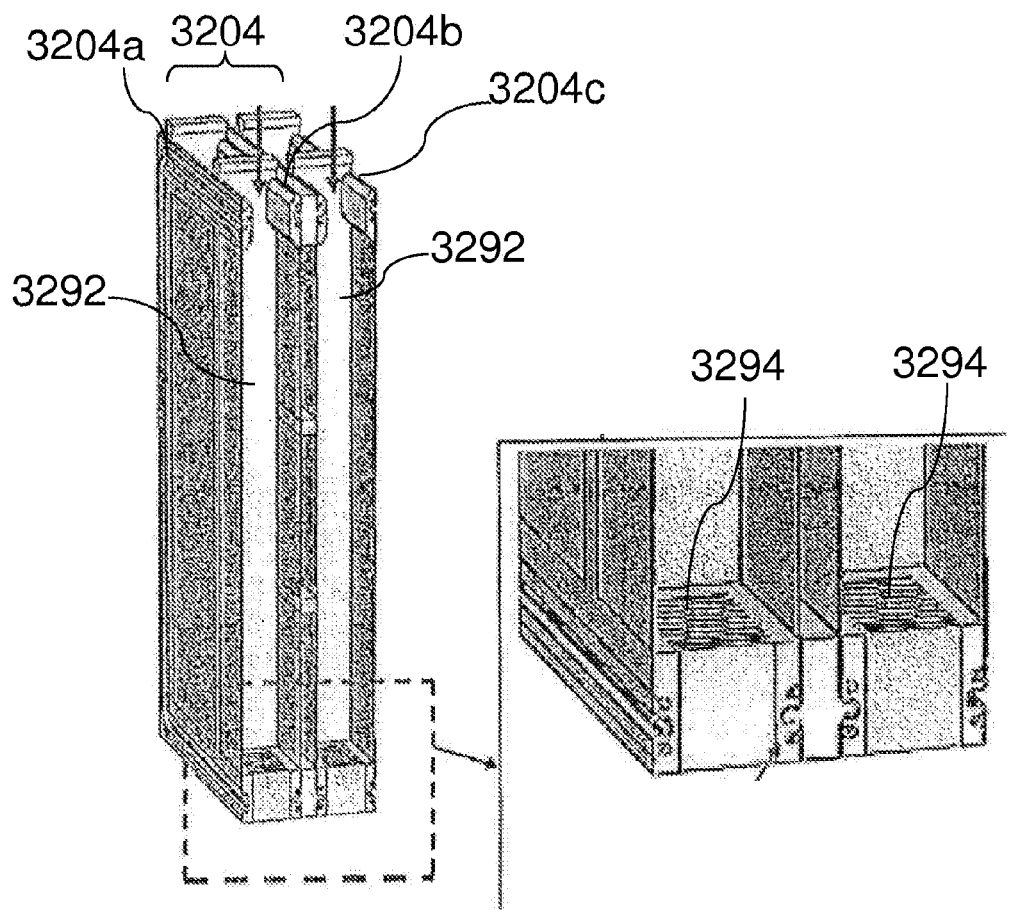
FIG. 32 is a schematic illustration of a cross-section view and detailed view of a partially assembled cell stack in accordance with one or more embodiments of the disclosure.

FIG. 32 shows a section view of a part of an assembled stack of spacers 3204, including 3204a, 3204b, and 3204c, and membranes and a detailed view of the mechanical seals interlocking. As shown in the detailed view, compartments 3292 may be filled with resins once the stack with the desired number of cell pairs is assembled. A slurry of resin in a fluid is pumped into the compartments. The resins may be retained in openings 3294 at the bottom of the compartments while the resin carrier fluid flows through. When the compartments are full, slotted plates are slid into place to retain resin in the compartments. The stack may then be rotated 90° and the dilute compartments may be filled with resin in a similar manner.

Figure 33:
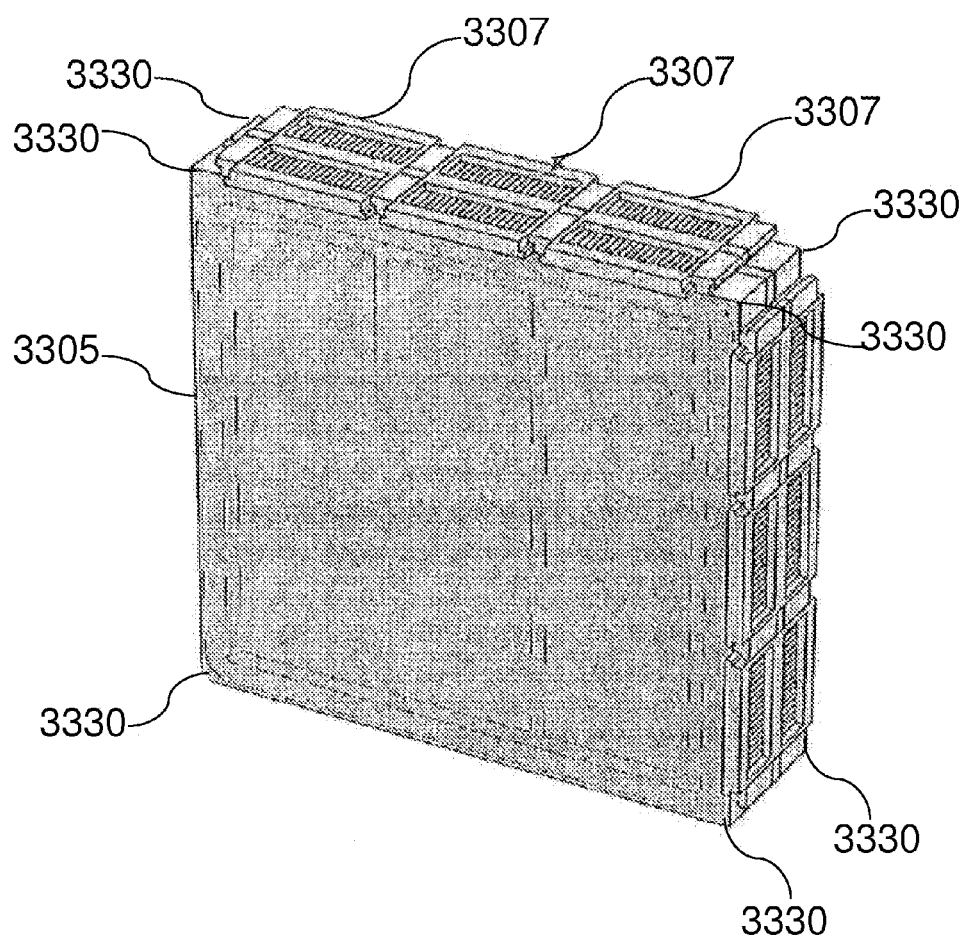
FIG. 33 is a schematic illustration of part of an assembled stack in accordance with one or more embodiments of the disclosure.

FIG. 33 shows a part of a membrane cell stack 3305 with resin retaining plates 3307 in place. Membrane cell stack 3305 may be secured in a housing at particular points along the periphery of cell stack 3305. For example, the cell stack may be secured at one or more corners 3330 of cell stack 3305.

Figure 34:
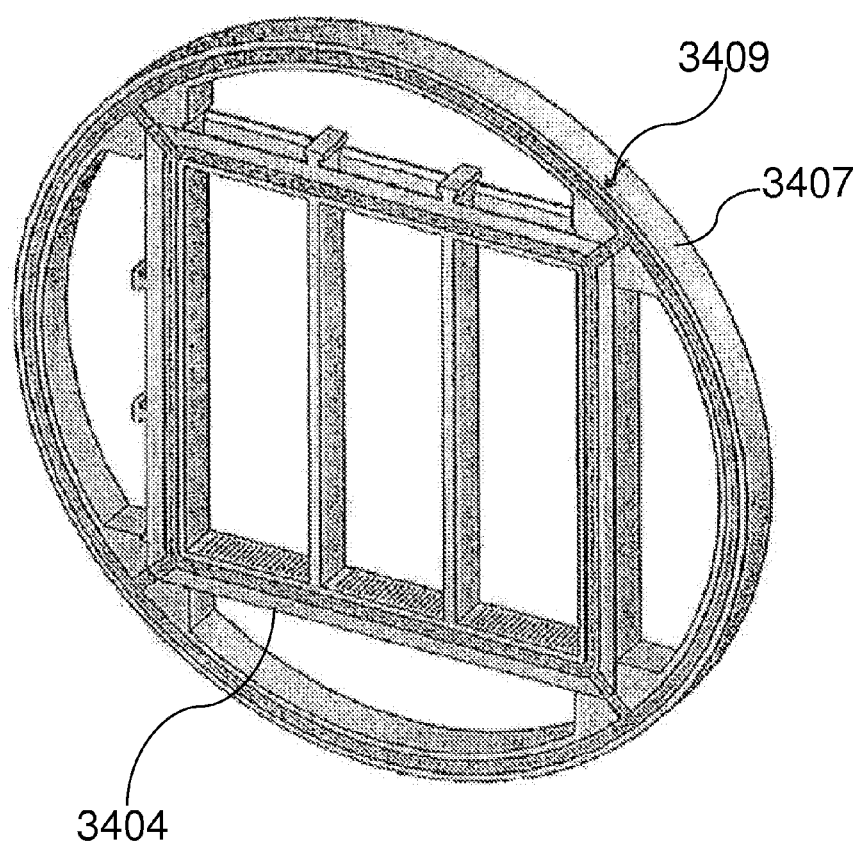
FIG. 34 is a schematic illustration of an overmolded spacer in accordance with one or more embodiments of the disclosure.

In another embodiment, the membranes may be sealed to the spacers with overmolded thermoplastic rubber (TPR) seals. After a stack of spacers and membranes is assembled and compressed, the concentrate and dilute flow compartments are filled with resins. FIG. 34 shows dilute spacer 3404 with rim 3407 and overmolded seal 3409. The overmolded seal may be present on both faces of the spacer. The concentrate spacer may be constructed similarly. In certain examples, the concentrate spacer may be constructed to be thinner than the dilute spacer, and may not comprise overmolded seals.

Figure 35:
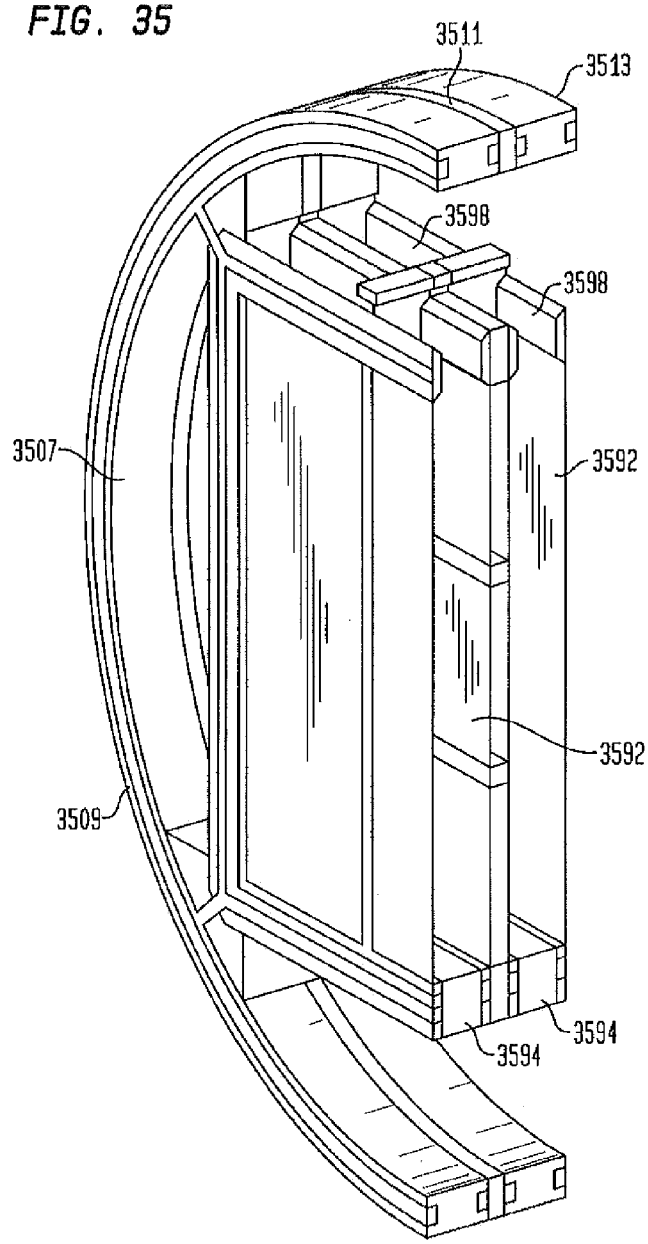
FIG. 35 is a schematic illustration of a section view of a cell stack in accordance with one or more embodiments of the disclosure.

FIG. 35 is a section view through part of a stack of spacers and membranes, including concentrate spacer 3511 and dilute spacer 3513. Openings 3594 retain resin within compartments 3592, and openings or slots 3598 at the opposite end of compartments 3592 allow for resin filling. In this particular embodiment, circular rims 3507 are shown, but other rim shapes can be used, such as rectangular, square, or polygonal, so long as the resultant cell stack may be adequately secured to the housing. In some embodiments, rims 3507 may eliminate the need for a housing. Radial overmolded seals 3509 may separate the dilute and concentrate inlet/outlet manifolds and therefore eliminate the requirement for corner securing or potting. Before adding resin to the stack, the stack may be compressed to seal the membranes and spacers together. This may be accomplished with, for example, temporary tie bars or clamps.

Figure 36:
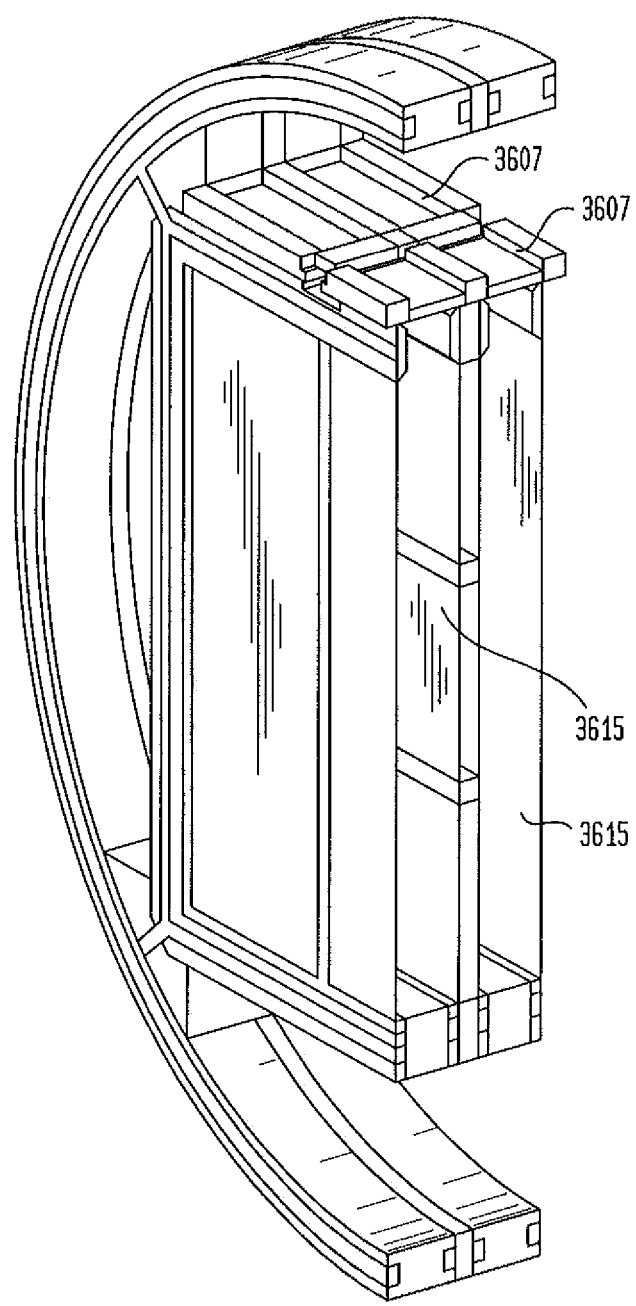
FIG. 36 is schematic illustration of a section view of a cell stack in accordance with one or more embodiments of the disclosure.

FIG. 36 is a section view showing resin retaining plates 3607 in place after resin filling dilute compartments 3615.

In certain embodiments, the sealing by overmolded seals and the mating by male features and female features may be used together to provide a secured membrane cell stack. The membranes may be sealed to the spacers with male and female features, while radial overmolded seals and the seals in the rim may seal the dilute spacers to the concentrate spacers. In this embodiment, it may not be necessary to use a housing or corner seals to seal the cell stack to a housing.

Figure 37:
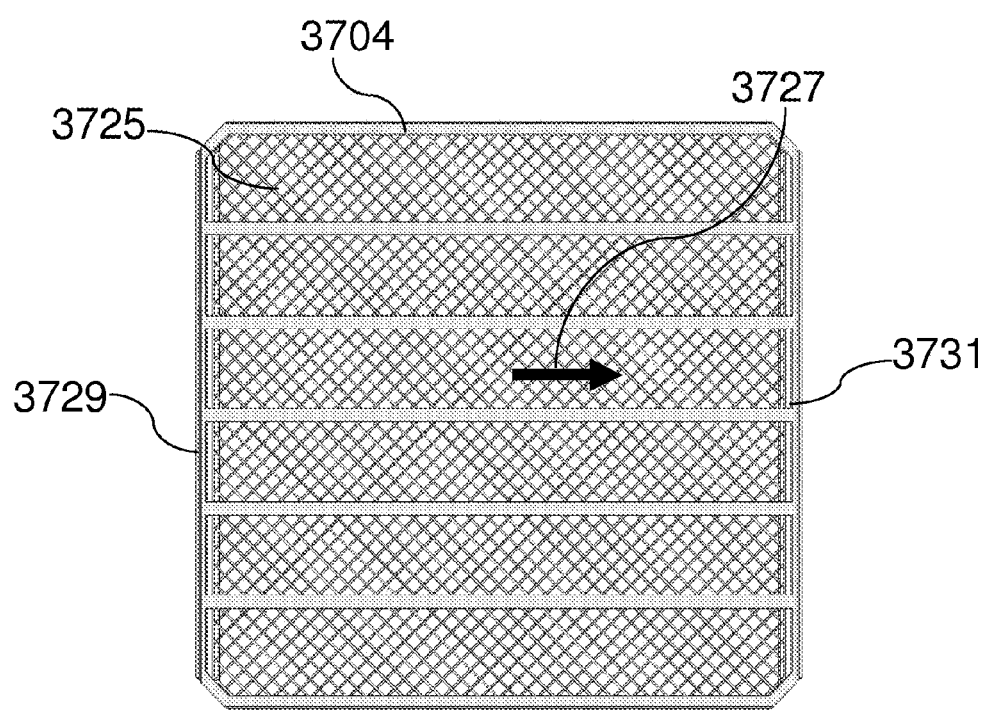
FIG. 37 is a schematic illustration of a top view of a spacer in accordance with one or more embodiments of the disclosure.

In certain embodiments, an injection molded spacer 3704 is provided that incorporates screen area 3725 as shown in FIG. 37. This Figure shows a fluid flow direction 3727. Openings are provided in two opposite edges 3729 and 3731. The openings may be formed by wires that are retracted prior to ejection of the part from the mold.

Figure 38A:
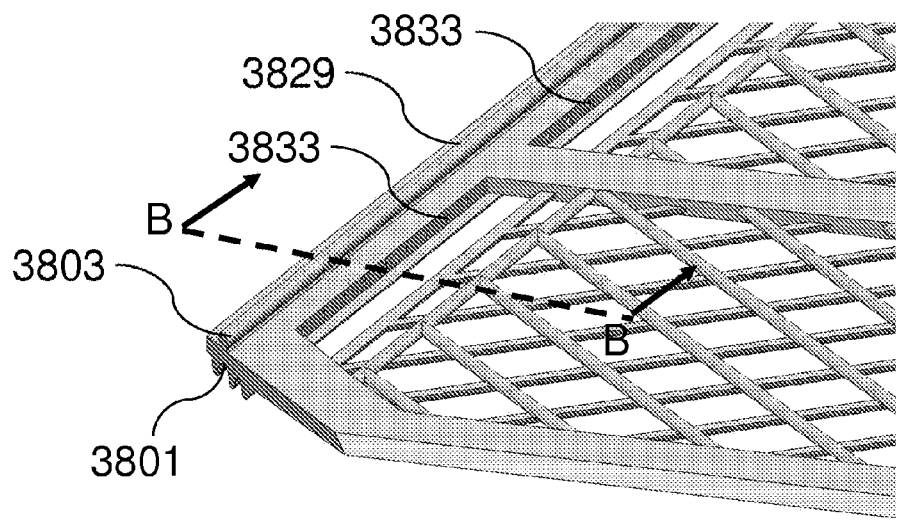
FIGS. 38A and 38B are schematic illustrations of a detail of a spacer in accordance with one or more embodiments of the disclosure.
Figure 38B:
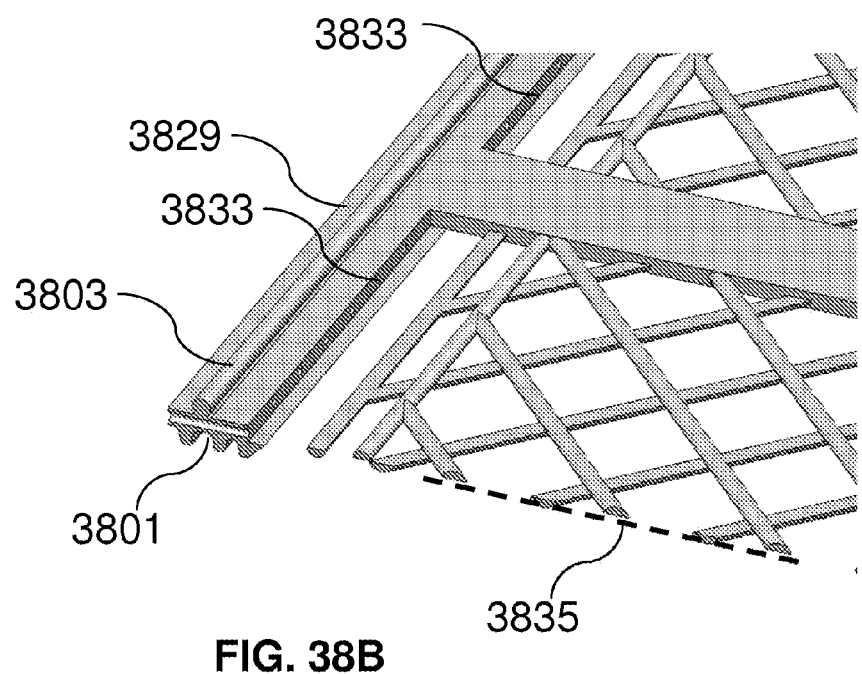

FIGS. 38A and 38B show details of openings, for example at 3833, in edge 3829 as discussed regarding FIG. 37. FIGS. 38A and 38B also show male features 3803 which may interlock with female features 3801.

A dashed parting line is shown in FIG. 38B. The spacer may be molded with one set of strands above parting line 3835 of the mold and one set of strands below parting line 3835. The strands of the screen spacer as shown in FIG. 38B have semi-circular cross-sections and the two sets of strands are oriented perpendicular to each other. The cross-sectional shape, orientation and frequency of the strands may be varied to promote fluid mixing and/or reduce a pressure drop. Ribs or baffles may be molded into the spacer to form flow channels and improve flow distribution.

In certain embodiments, the male and female features are molded on the top and bottom respectively of the edges that contain inlet and outlet openings 3833.

The selection of material for the spacer may depend on the ability for it to be molded with thin walls and small dimensions, for example, on the order of about 0.060 inches (1.5 mm) or less. The material may also have the ability to be molded with small holes, preferably on the order of about 0.030 inches (0.75 mm) or less. The material may have a suitable elasticity to allow appropriate interlocking of the male and female features, and may have chemical compatibility with the fluid to be purified.

Figure 39:
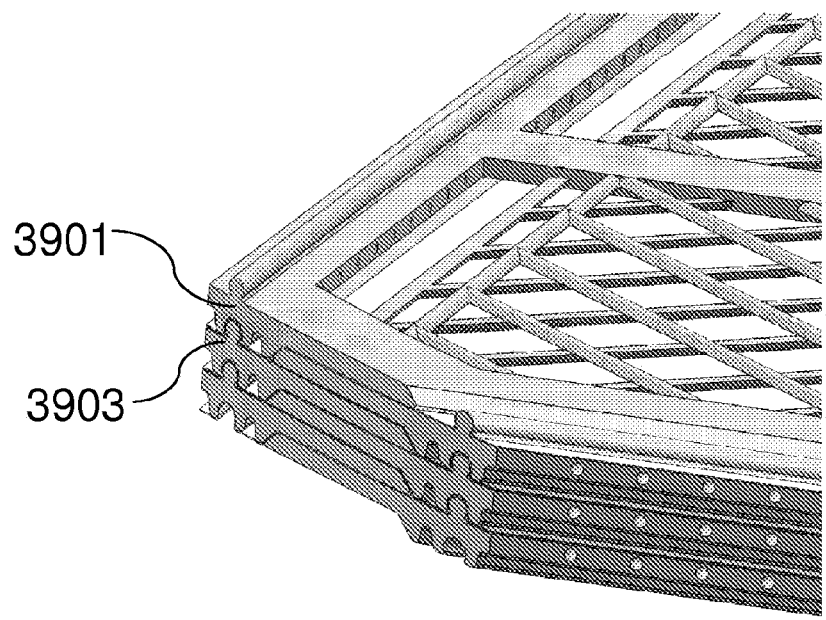
FIG. 39 is a schematic illustration of a stack of spacers and membranes in accordance with one or more embodiments of the invention.
Figure 40:
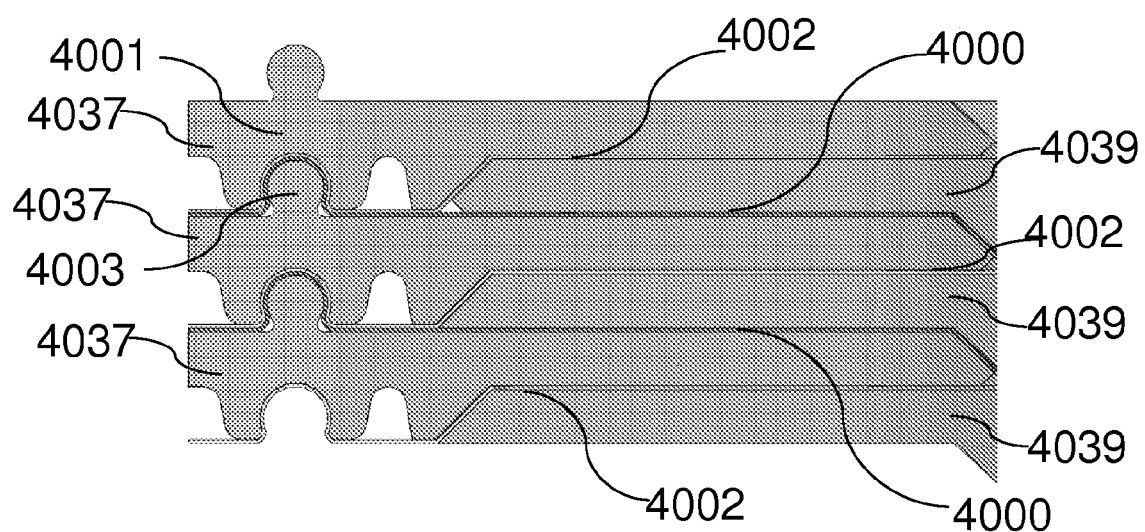
FIG. 40 is a schematic illustration of a stack of spacers and membranes in accordance with one or more embodiments of the invention.

FIG. 39 shows a portion of a stack of spacers and membranes. As shown, male features 3903 interlock with female features 3901. Similarly, in FIG. 40, male features 4003 interlock with female features 4001. Cation exchange membranes 4000 and anion exchange membranes 4002 are secured between the spacers. Spacers for a first stream 4037 seal the edges of the membranes bound for the second stream, while spacers for the second stream 4039 seal the edges of the membranes bound for the first stream.

In certain embodiments of the disclosure the flow within a compartment may be adjusted, redistributed, or redirected to provide greater contact of the fluid with the membrane surfaces within the compartment. The compartment may be constructed and arranged to redistribute fluid flow within the compartment. The compartment may have obstructions, projections, protrusions, flanges, or baffles that may provide a structure to redistribute the flow through the compartment. The obstructions, projections, protrusions, flanges, or baffles may be formed as part of ion exchange membranes, the spacer, or may be an additional separate structure that is provided within the compartment. The obstructions, projections, protrusions, flanges, or baffles may be formed by providing an extension from an adhesive that may secure the ion exchange membranes to one another. The spacer may be impregnated with thermoplastic rubber to form protrusions that may be bonded with adhesive to adjacent membranes. The thermoplastic rubber may be applied to the spacer using processes such as thermo-compression or rotary screen printing. The compartments may or may not contain ion exchange resin.

Figure 41:
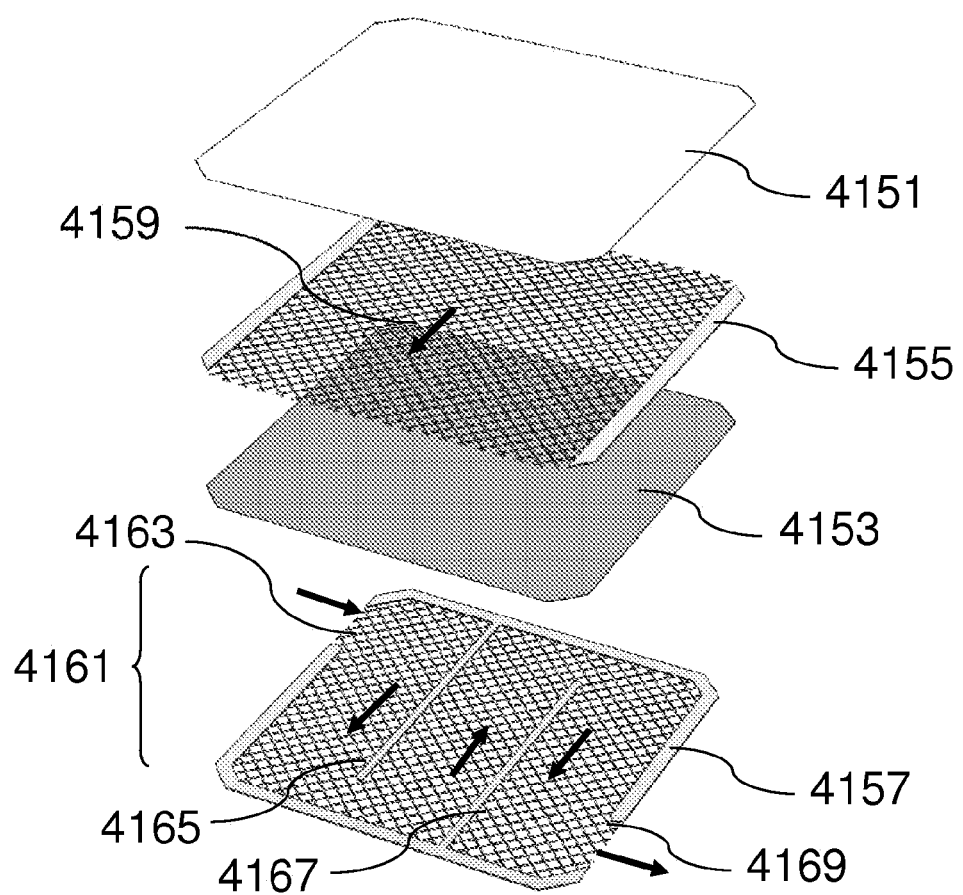
FIG. 41 is a schematic illustration of a stack of spacers and membranes in accordance with one or more embodiments of the invention.

As shown in FIG. 41, first ion exchange membrane 4151 and second ion exchange membrane 4153 are shown with first spacer 4155 and a second spacer 4157 positioned adjacent them. First stream 4159 is shown as flowing parallel to the flow of second stream 4161, due to second spacer 4157 having baffles that redistribute the flow from inlet 4163 of spacer 4157, around first baffle 4165 and around second baffle 4167, and through outlet 4169.

Figure 42:
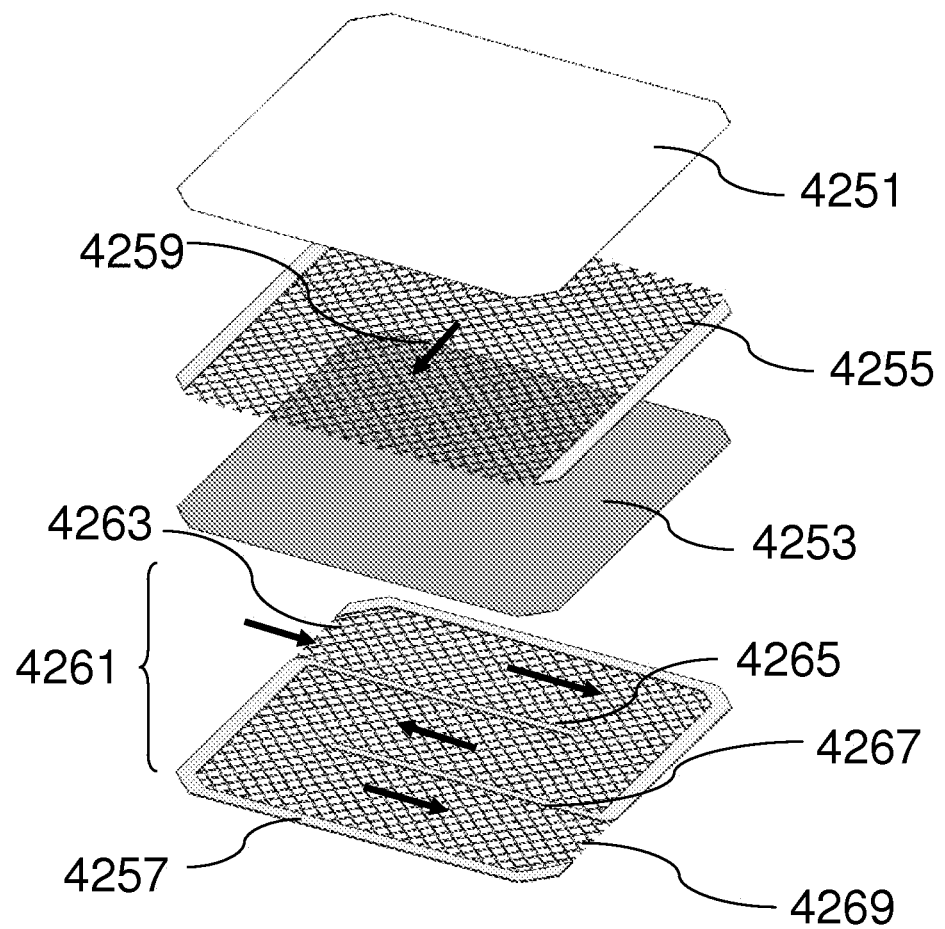
FIG. 42 is a schematic illustration of a stack of spacers and membranes in accordance with one or more embodiments of the invention.

As shown in FIG. 42, first ion exchange membrane 4251 and second ion exchange membrane 4253 are shown with first spacer 4255 and second spacer 4257 positioned adjacent them. First stream 4259 is shown as flowing perpendicular to the flow of second stream 4261, due to second spacer 4257 having baffles that redistribute the flow from inlet 4263 of spacer 4257, around first baffle 4265 and around second baffle 4267 and through outlet 4269.

Figure 43:
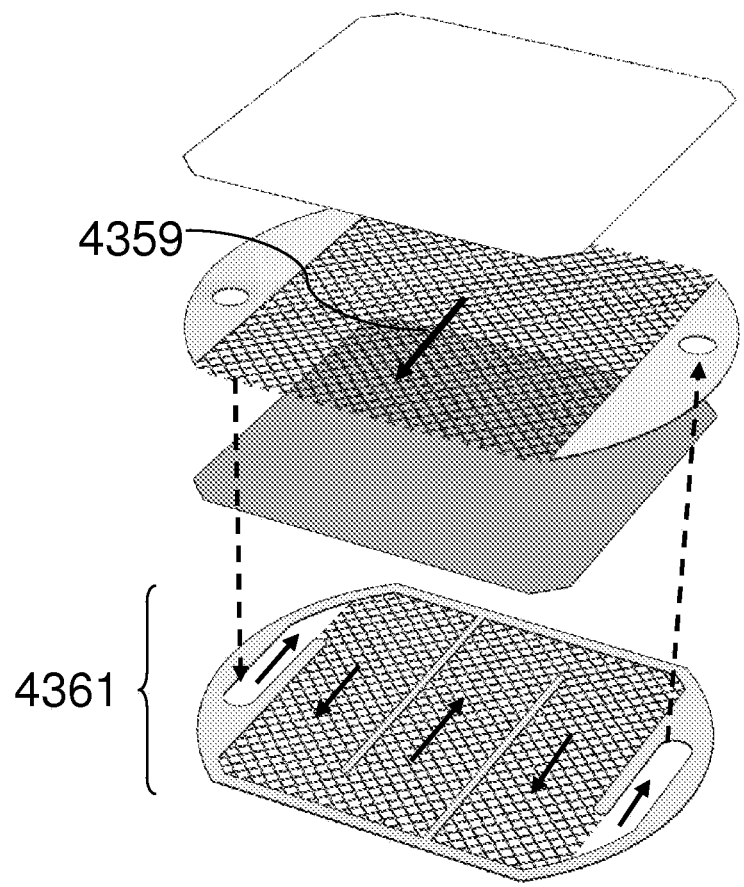
FIG. 43 is a schematic illustration of a stack of spacers and membranes in accordance with one or more embodiments of the invention.
Figure 44:
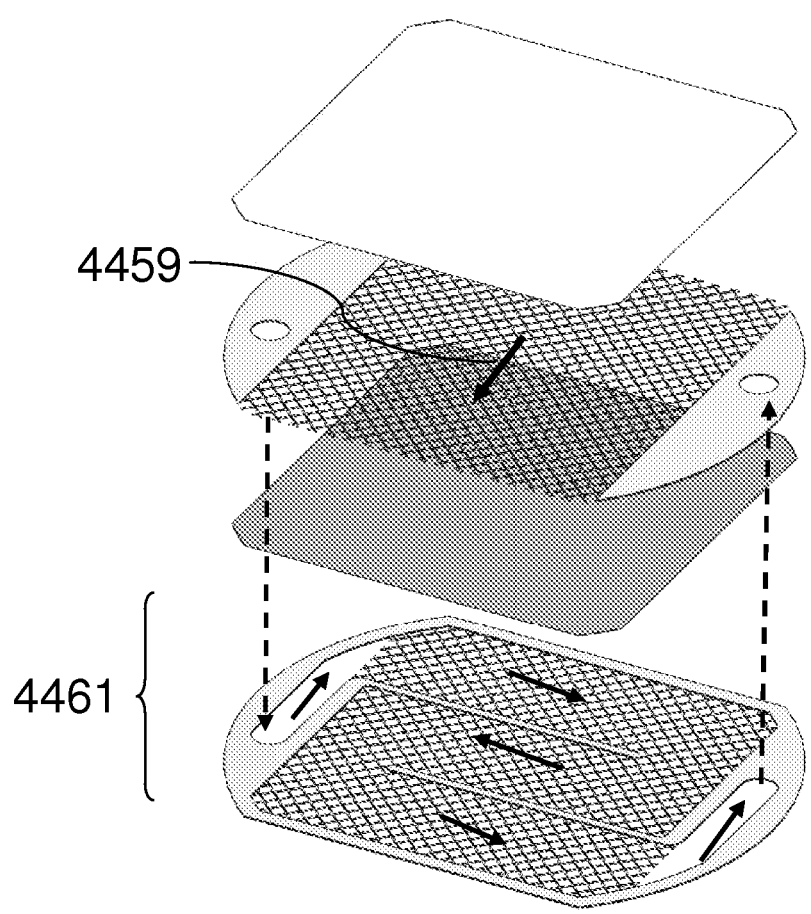
FIG. 44 is a schematic illustration of a stack of spacers and membranes in accordance with one or more embodiments of the invention At least some of the drawings may depict membranes, spacers, cell stacks, and housings in particular configurations and geometries. However, the disclosure is not limited to these particular configurations and geometries. For example, the housing may be of any suitable geometry such that one or more membrane cell stacks or modular units may be secured within. For example, the housing may be cylindrical, polygonal, square, or rectangular. With regard to the membrane cell stacks and modular units, any suitable geometry is acceptable so long as the cell stack or modular unit may be secured to the housing. For example the membranes or spacers may be rectangular in shape. In certain embodiments, a housing may not be required. The geometry of the membranes and spacers may be of any suitable geometry such that the membranes and spacers may be secured within a cell stack. In certain embodiments, a particular number of corners or vertices on the cell stack may be desired. For example, three or more corners or vertices may be desired to secure the cell stack to the housing. In certain embodiments, the geometry of any of the housing, cell stack, membranes, and spacers may be selected to accommodate operational parameters of the electrical purification apparatus. For example, the spacers may be asymmetrical to accommodate differences in flow rates between the dilute and concentrate streams.

FIGS. 43 and 44 show additional embodiments with the compartments for the two streams formed by injection molded spacers. In FIG. 43, the flow path for second stream 4361 may be co-current or counter-current to first stream 4359. In FIG. 44, the flow path for second stream 4461 may be perpendicular to first stream 4459. Selected solid portions of the spacers may be bonded to adjacent membranes with adhesives. Alternatively, the membranes may be thermally bonded to the spacers, such as by ultrasonic, vibration, or laser welding. As shown in these Figures, the dotted arrows indicate the flow in the inlet and outlet manifolds for the second stream. These manifolds are not contingent to the inlet and the outlet to the flow compartment for the second stream. Therefore, the leakage current down the manifolds between the anode and the cathode is expected to be reduced.

In some embodiments of the disclosure, a method of providing a source of potable water is provided. In certain embodiments, a method of facilitating the production of potable water from seawater is provided. The method may comprise providing an electrical purification apparatus comprising a cell stack. The method may further comprise fluidly connecting a seawater feed stream to an inlet of the electrical purification apparatus. The method may further comprise fluidly connecting an outlet of the electrical purification apparatus to a potable point of use. Seawater or estuary water may have a concentration of total dissolved solids in a range of about 10,000 to about 45,000 ppm. In certain examples, the seawater or estuary water may have a concentration of total dissolved solids of about 35,000 ppm.

In this embodiment, the cell stack may comprise alternating ion diluting compartments and ion concentrating compartments. Each of the ion diluting compartments may be constructed and arranged to provide a fluid flow in a first direction. Each of the ion concentrating compartments may be constructed and arranged to provide a fluid flow in a second direction that is different from the first direction, as discussed above. Further, each of the ion concentrating compartment and the ion diluting compartments may be constructed and arranged to provide a predetermined percentage of surface area or membrane utilization for fluid contact to each of the alternating ion diluting compartments and ion depleting compartments. As discussed above, it has been found that greater membrane utilization provides greater efficiencies in the operation of the electrical purification apparatus. In certain embodiments, the membrane utilization that may be achieved is greater than 65%. In other embodiments, the membrane utilization that may be achieved is greater than 75%. In certain other embodiments, the membrane utilization that may be achieved may be greater than 85%.

At least one of the ion diluting compartments and ion concentrating compartments may comprise a spacer. The spacer may be a blocking spacer. This may allow passing of the seawater feed through multiple stages or passes through the electrical purification apparatus to provide the source of potable water.

The first direction of fluid flow and the second direction of fluid flow may be selected and provided by way of the construction and arrangement of the compartments. Using the first direction of fluid flow as a direction running along a 0° axis, the second direction of fluid flow may run in a direction of any angle greater than zero degrees and less than 360°. In certain embodiments of the disclosure, the second fluid flow path may run at a 90° angle, or perpendicular to the first fluid flow path. In other embodiments, the second fluid flow path may run at a 180° angle to the first fluid flow path.

The method may further comprise redistributing fluid within at least one of the alternating ion diluting compartments and ion concentrating compartments. One or more of the compartments may be constructed and arranged to redistribute or redirect the fluid flow. This may be accomplished through use of a particular spacer or membrane that defines the compartment that may provide a configuration to redistribute the fluid flow, as described above.

The electrical purification apparatus may further comprise a housing enclosing the cell stack. At least a portion of the periphery of the cell stack may be secured to the housing. The electrical purification apparatus may further comprise a frame or support structure positioned between the housing and the cell stack. The frame may be adjacent to or connected to the cell stack to provide a modular unit. The electrical purification apparatus may further comprise a second modular unit that may be secured within the housing. The second modular unit may be secured within the housing such that an ion exchange membrane of the first modular unit is adjacent an ion exchange membrane of the second modular unit.

The method of providing a source of potable water may comprise redirecting at least one of electrical current and fluid flow between the first modular unit and the second modular unit. This may be accomplished, for example, by providing a blocking spacer between the first modular unit and the second modular unit.

A bracket assembly may be positioned between the frame and the housing to secure the modular unit to the housing.

Other types of feed water comprising different concentrations of total dissolved solids may be treated or processed using the apparatus and methods of the present disclosure. For example, brackish water, having a total dissolved solids content in a range of about 1000 ppm to about 10,000 ppm may be treated to produce potable water. Brine, having a total dissolved solids content in a range of about 50,000 ppm to about 150,000 ppm may be treated to produce potable water. In some embodiments, brine, having a total dissolved solids content in a range of about 50,000 ppm to about 150,000 ppm may be treated to produce a water having a lower total dissolved solids content for purposes of disposal, for example, to a body of water, such as an ocean.

While exemplary embodiments of the disclosure have been disclosed many modifications, additions, and deletions may be made therein without departing from the spirit and scope of the disclosure and its equivalents, as set forth in the following claims.

Those skilled in the art would readily appreciate that the various parameters and configurations described herein are meant to be exemplary and that actual parameters and configurations will depend upon the specific application for which the electrical purification apparatus and methods of the present disclosure are used. Those skilled in the art will recognize, or be able to ascertain using no more than routine experimentation, many equivalents to the specific embodiments described herein. For example, those skilled in the art may recognize that the apparatus, and components thereof, according to the present disclosure may further comprise a network of systems or be a component of a water purification or treatment system. It is, therefore, to be understood that the foregoing embodiments are presented by way of example only and that, within the scope of the appended claims and equivalents thereto, the disclosed electrical purification apparatus and methods may be practiced otherwise than as specifically described. The present apparatus and methods are directed to each individual feature or method described herein. In addition, any combination of two or more such features, apparatus or methods, if such features, apparatus or methods are not mutually inconsistent, is included within the scope of the present disclosure.

For example, the housing may be of any suitable geometry such that one or more membrane cell stacks or modular units may be secured within. For example, the housing may be cylindrical, polygonal, square, or rectangular. With regard to the membrane cell stacks and modular units, any suitable geometry is acceptable so long as the cell stack or modular unit may be secured to the housing. For example the membranes or spacers may be rectangular in shape. In certain embodiments, a housing may not be required. The geometry of the membranes and spacers may be of any suitable geometry such that the membranes and spacers may be secured within a cell stack. In certain embodiments, a particular number of corners or vertices on the cell stack may be desired. For example, three or more corners or vertices may be desired to secure the cell stack to the housing. In certain embodiments, the geometry of any of the housing, cell stack, membranes, and spacers may selected to accommodate operational parameters of the electrical purification apparatus. For example, the spacers may be asymmetrical to accommodate differences in flow rates between the dilute and concentrate streams.

Further, it is to be appreciated various alterations, modifications, and improvements will readily occur to those skilled in the art. Such alterations, modifications, and improvements are intended to be part of this disclosure, and are intended to be within the spirit and scope of the disclosure. For example, an existing facility may be modified to utilize or incorporate any one or more aspects of the disclosure. Thus, in some cases, the apparatus and methods may involve connecting or configuring an existing facility to comprise an electrical purification apparatus. Accordingly, the foregoing description and drawings are by way of example only. Further, the depictions in the drawings do not limit the disclosures to the particularly illustrated representations.

As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of," are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A cell stack for an electrical purification apparatus comprising:
   a plurality of alternating ion depleting compartments and ion concentrating compartments, each alternating ion depleting compartment and ion concentrating compartment defined by an anion exchange membrane and a cation exchange membrane, each of the ion depleting compartments having an inlet and an outlet to provide a dilute fluid flow in a first direction and each of the ion concentrating compartments having an inlet and an outlet to provide a concentrated fluid flow in a second direction that is different from the first direction; and
   a blocking spacer comprising a screen portion positioned inside of at least one of the ion depleting compartments and ion concentrating compartments, and a solid portion positioned outside of the at least one ion depleting compartment and ion concentrating compartment, the solid portion configured to redirect fluid flow through the cell stack.

2. The cell stack of claim 1, wherein the blocking spacer is constructed and arranged to reduce electrical current inefficiencies in the electrical purification apparatus.

3. The cell stack of claim 1, wherein the blocking spacer is constructed and arranged to redirect electrical current within the cell stack.

4. The cell stack of claim 1, wherein at least one of the plurality of ion depleting and ion concentrating compartments comprises a flow redistributor.

5. The cell stack of claim 1, further comprising a housing enclosing the cell stack, at least a portion of a periphery of the cell stack secured to the housing.

6. The cell stack of claim 5, further comprising a frame positioned between the housing and the cell stack to provide a first modular unit.

7. The cell stack of claim 6, further comprising a second modular unit secured within the housing.

8. The cell stack of claim 7, further comprising a blocking spacer positioned between the first modular unit and the second modular unit.

9. The cell stack of claim 6, further comprising a bracket assembly positioned between the frame and the housing.

10. The cell stack of claim 1, wherein the first direction is perpendicular to the second direction.

11. An electrical purification apparatus comprising:
    a cell stack comprising alternating ion diluting compartments and ion concentrating compartments, each alternating ion diluting compartment and ion concentrating compartment defined by an anion exchange membrane and a cation exchange membrane, each of the ion diluting compartments constructed and arranged to provide a fluid flow in a first direction, and each of the ion concentrating compartments constructed and arranged to provide a fluid flow in a second direction that is different from the first direction;
    a first electrode at a first end of the cell stack;
    a second electrode at a second end of the cell stack; and
    a blocking spacer comprising a screen portion positioned inside of at least one of the ion depleting compartments and ion concentrating compartments, and a solid portion positioned outside of the at least one ion depleting compartment and the ion concentrating compartment, the solid portion configured to redirect flow through the cell stack.

12. The electrical purification apparatus of claim 11, wherein the blocking spacer is constructed and arranged to reduce electrical current inefficiencies in the electrical purification apparatus.

13. The electrical purification apparatus of claim 11, wherein at least one of the ion diluting compartments and ion concentrating compartments comprises a flow redistributor.

14. The electrical purification apparatus of claim 11, further comprising a housing enclosing the cell stack, at least a portion of a periphery of the cell stack secured to the housing.

15. The electrical purification apparatus of claim 14, further comprising a frame positioned between the housing and the cell stack to provide a first modular unit.

16. The electrical purification apparatus of claim 15, further comprising a second modular unit secured within the housing.

17. The electrical purification apparatus of claim 16, further comprising a blocking spacer positioned between the first modular unit and the second modular unit.

18. The electrical purification apparatus of claim 15, further comprising a bracket assembly positioned between the frame and the housing.

19. The electrical purification apparatus of claim 11, wherein the first direction is perpendicular to the second direction.

* * * * *